US009195093B2

(12) United States Patent
Nam et al.

(10) Patent No.: US 9,195,093 B2

(45) Date of Patent: Nov. 24, 2015

(54) POLARIZER, LIQUID CRYSTAL DISPLAY, AND MANUFACTURING METHOD THEREOF

(71) Applicant: Samsung Display Co., Ltd., Yongin, Gyeonggi-Do (KR)

(72) Inventors: Jung Gun Nam, Seoul (KR); Dae-Young Lee, Suwon-si (KR); Dae Hwan Jang, Gwangmyeong-si (KR); Gug Rae Jo, Asan-si (KR); Atsushi Takakuwa, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 217 days.

(21) Appl. No.: 13/896,372

(22) Filed: May 17, 2013

(65) Prior Publication Data

US 2014/0098330 A1 Apr. 10, 2014

(30) Foreign Application Priority Data

Oct. 8, 2012 (KR) ........................ 10-2012-0111503

(51) Int. Cl.

| | |
|---|---|
| ***G02F 1/1335*** | (2006.01) |
| ***G02B 5/30*** | (2006.01) |
| ***G02F 1/1333*** | (2006.01) |
| ***G02B 5/20*** | (2006.01) |

(52) U.S. Cl.

CPC .......... *G02F 1/133536* (2013.01); *G02B 5/201* (2013.01); *G02B 5/3058* (2013.01); *G02F 1/133371* (2013.01); *G02F 2001/133548* (2013.01)

(58) Field of Classification Search

CPC .................... G02F 1/133512; G02F 1/136209; G02F 1/133528; G02F 1/133555; G02F 2001/133548; G02F 2203/09

See application file for complete search history.

(56) References Cited

U.S. PATENT DOCUMENTS

| | | | | |
|---|---|---|---|---|
| 6,243,199 | B1 | 6/2001 | Hansen et al. | |
| 6,288,840 | B1 | 9/2001 | Perkins et al. | |
| 7,619,816 | B2 | 11/2009 | Deng et al. | |
| 7,738,056 | B2 | 6/2010 | Tsujimura et al. | |
| 7,750,995 | B2 * | 7/2010 | Kim | 349/96 |
| 7,820,252 | B2 * | 10/2010 | Higashi et al. | 428/1.3 |
| 7,965,357 | B2 | 6/2011 | Van De Witte et al. | |
| 2010/0079706 | A1 | 4/2010 | Kim et al. | |
| 2012/0057106 | A1 | 3/2012 | Park et al. | |
| 2014/0354923 | A1 * | 12/2014 | Lee et al. | 349/96 |

FOREIGN PATENT DOCUMENTS

| | | | |
|---|---|---|---|
| JP | 2009-042319 | A | 2/2009 |
| JP | 2009-139457 | A | 6/2009 |
| JP | 2009-156885 | A | 7/2009 |
| KR | 1020070105092 | A | 10/2007 |
| KR | 100927955 | | 11/2009 |
| KR | 1020120040413 | A | 4/2012 |

* cited by examiner

*Primary Examiner* — Huyen Ngo

(74) *Attorney, Agent, or Firm* — Cantor Colburn LLP

(57) ABSTRACT

A polarizer includes an opening defined in the polarizer and through which light transmits; a non-opening which is adjacent to the opening and blocks the light; a plurality of metal lines elongated in a first direction, and separated from each other in a second direction different than the first direction, in the opening; and a plate-type pattern in the non-opening. A height of the metal lines is smaller than a height of the plate-type pattern, from a same reference; and an interval in the second direction and between adjacent metal lines is smaller than a wavelength of visible light rays.

20 Claims, 16 Drawing Sheets

211 212 213 214 215 21 111 112 113 114 115 11 BM TA 213 212 215 214 211 210 220 200 230 250 270 3 310 180 173 154 175 190 115 100 114 110 140 124 113 112 111 500

POLARIZER, LIQUID CRYSTAL DISPLAY, AND MANUFACTURING METHOD THEREOF

This application claims priority to Korean Patent Application No. 10-2012-0111503 filed on Oct. 8, 2012, and all the benefits accruing therefrom under 35 U.S.C. §119, the entire contents of which are incorporated herein by reference.

BACKGROUND (a) Field

The invention relaters to a polarizer, a liquid crystal display and a method of manufacturing the same, and in detail, to a reflective polarizer, a liquid crystal display including the same and a method of manufacturing the same.

(b) Description of the Related Art

A liquid crystal display ("LCD") is one of the most widely used flat panel displays. An LCD includes two panels provided with field-generating electrodes such as pixel electrodes and a common electrode, and a liquid crystal ("LC") layer interposed therebetween. The LCD displays images by applying voltages to the field-generating electrodes to generate an electric field in the LC layer, and the electric field determines orientations of LC molecules in the LC layer to adjust polarization of incident light.

An LCD may be classified into a transmissive LCD, a reflective LCD and a transflective LCD according to a light source. The transmissive LCD displays an image using an internal light source such as a backlight located at a rear side of the LCD, the reflective LCD displays an image using an external light source such as natural light, and the transflective LCD has a combined structure of a transmissive LCD and a reflective LCD and includes a reflective area and a transmissive area.

Of them, the transmissive LCD and the transflective LCD that display images by using the backlight are commonly used because a display luminance is high.

SUMMARY

One or more embodiment of the invention provides a polarizer that increases efficiency by using light provided from a backlight unit, and a liquid crystal display including the same.

An exemplary embodiment of a polarizer according to the invention includes an opening defined in the polarizer and through which light transmits; a non-opening which is adjacent to the opening and blocks the light; a plurality of metal lines elongated in a first direction, and separated from each other in a second direction different than the first direction, in the opening; and a plate-type pattern in the non-opening. A height of the plurality of metal lines is smaller than a height of the plate-type pattern, from a same reference; and an interval in the second direction and between adjacent metal lines is smaller than a wavelength of visible light rays.

The plate-type pattern may include a plate-type metal pattern with the same height as the metal lines, and an additional plate-type pattern on the plate-type metal pattern.

The additional plate-type pattern may include a metal or a dielectric material, and the dielectric material may include TiO2 or SiO2 or have a highly reflective characteristic or an anti-reflective characteristic.

The additional plate-type pattern may have a dual-layered structure.

The polarizer may further include a second minute additional layer above the plurality of metal lines; and a second plate-type additional layer between the plate-type metal pattern and the additional plate-type pattern. A height of the second minute additional layer and a height of the second plate-type additional layer are the same, from the same reference.

The second minute additional layer and the second plate-type additional layer may include the metal or the dielectric material.

The polarizer may further include a first minute additional layer under the plurality of metal lines; and a first plate-type additional layer under the plate-type metal pattern. A height of the first minute additional layer and a height of the first plate-type additional layer are the same, from the same reference.

The first minute additional layer and the first plate-type additional layer may include the metal or the dielectric material.

An exemplary embodiment of a liquid crystal display according to the invention includes: a lower panel including a lower insulation substrate, and a lower polarizer on a surface of the lower insulation substrate; an upper panel including an upper insulation substrate, and an upper polarizer on a surface of the upper insulation substrate; a light blocking member, and an opening defined in the light blocking member through which light transmits; and a liquid crystal layer between the upper panel and the lower panel. The lower polarizer or the upper polarizer is a reflective polarizer. The reflective polarizer includes an opening defined in the reflective polarizer and through which the light transmits, a non-opening which is adjacent to the opening and blocks the light, a plurality of metal lines elongated in a first direction, and separated from each other in a second direction different than the first direction, in the opening, and a plate-type pattern in the non-opening. The opening defined in the reflective polarizer has a same plane shape as the opening defined in the light blocking member.

A height of the metal line may be smaller than a height of the plate-type pattern in the reflective polarizer, and an interval between adjacent metal lines may be smaller than a wavelength of visible light rays.

The plate-type pattern may include a plate-type metal pattern with the same height as the metal lines, and an additional plate-type pattern positioned on the plate-type metal pattern.

The lower polarizer may be the reflective polarizer. The polarizer may further include a first opposing insulating layer covering the plurality of metal lines and the plate-type pattern of the lower polarizer. The plurality of metal lines and the plate-type metal pattern of the lower polarizer are between the lower insulation substrate and the upper panel. Within the lower polarizer, the additional plate-type pattern is on the plate-type metal pattern. The first opposing insulating layer is on the additional plate-type pattern of the lower polarizer.

The first opposing insulating layer may be separated from the plurality of metal lines by a predetermined distance.

The additional plate-type pattern may include a metal or a dielectric material, and the dielectric material may include TiO2 or SiO2 or has a highly reflective characteristic or an anti-reflective characteristic.

The additional plate-type pattern may have a dual-layered structure.

The upper polarizer may be an absorption-type polarizer.

The upper polarizer may be a second reflective polarizer. The upper polarizer may include a second opposing insulating layer covering the plurality of metal lines and the plate-type pattern of the upper polarizer. The upper insulation substrate is between the plurality of metal lines and the plate-type metal pattern of the upper polarizer, and the lower panel. In the upper polarizer, the additional plate-type pattern is on the plate-type metal pattern. The second opposing insulating layer is on the additional plate-type pattern of the upper polarizer.

The upper polarizer may be a second reflective polarizer. The upper polarizer may further include a second opposing insulating layer covering the plurality of metal lines and the plate-type pattern of the upper polarizer. The plurality of metal lines and the plate-type pattern of the upper polarizer are between the upper insulation substrate, and the lower panel. In the upper polarizer, the additional plate-type pattern and the transparent region are under the plate-type pattern and the plurality of metal lines, respectively. The second opposing insulating layer is under the additional plate-type pattern and the transparent region of the upper polarizer.

An exemplary embodiment of a manufacturing method of a polarizer according to the invention includes: sequentially providing a metal layer, a first hard mask material and a polymer layer, on a supporting member; compressing the polymer layer by using a mold, to form a linear pattern in the polymer layer; etching the first hard mask material by using the linear pattern in the polymer layer as a mask, to form a first hard mask pattern; providing a photoresist on the first hard mask pattern in an opening area and on a non-opening area of the polarizer, and exposing the photoresist by using an exposure mask to remove the photoresist in the non-opening area of the polarizer; sequentially providing an additional plate-type pattern material on the metal layer and the photoresist, and a second hard mask material on the additional plate-type pattern material; lifting the photoresist to remove the additional plate-type pattern material and the second hard mask material on the photoresist together, and to form a second hard mask pattern; and etching the metal layer and the additional plate-type pattern material by using the first hard mask pattern and the second hard mask pattern as a mask.

The first hard mask pattern may include a plurality of elongated portions separated from each other by an interval which is smaller a wavelength of visible light rays.

As described above, by the polarizer including the elongated metal lines separated by an interval which is smaller than the wavelength of visible light rays, light perpendicular to the transmissive axis of the polarizer is also reflected by the polarizer to be used for the image display of the image such that the luminance of a liquid crystal display including the polarizer is improved. Also, a luminance improvement film used for a backlight unit which provides light the liquid crystal display may be omitted, and an anti-reflection film or an anti-glare film may be omitted at a front surface of the liquid crystal display such that manufacturing cost may be reduced.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION OF THE EMBODIMENTS

Figure 1:
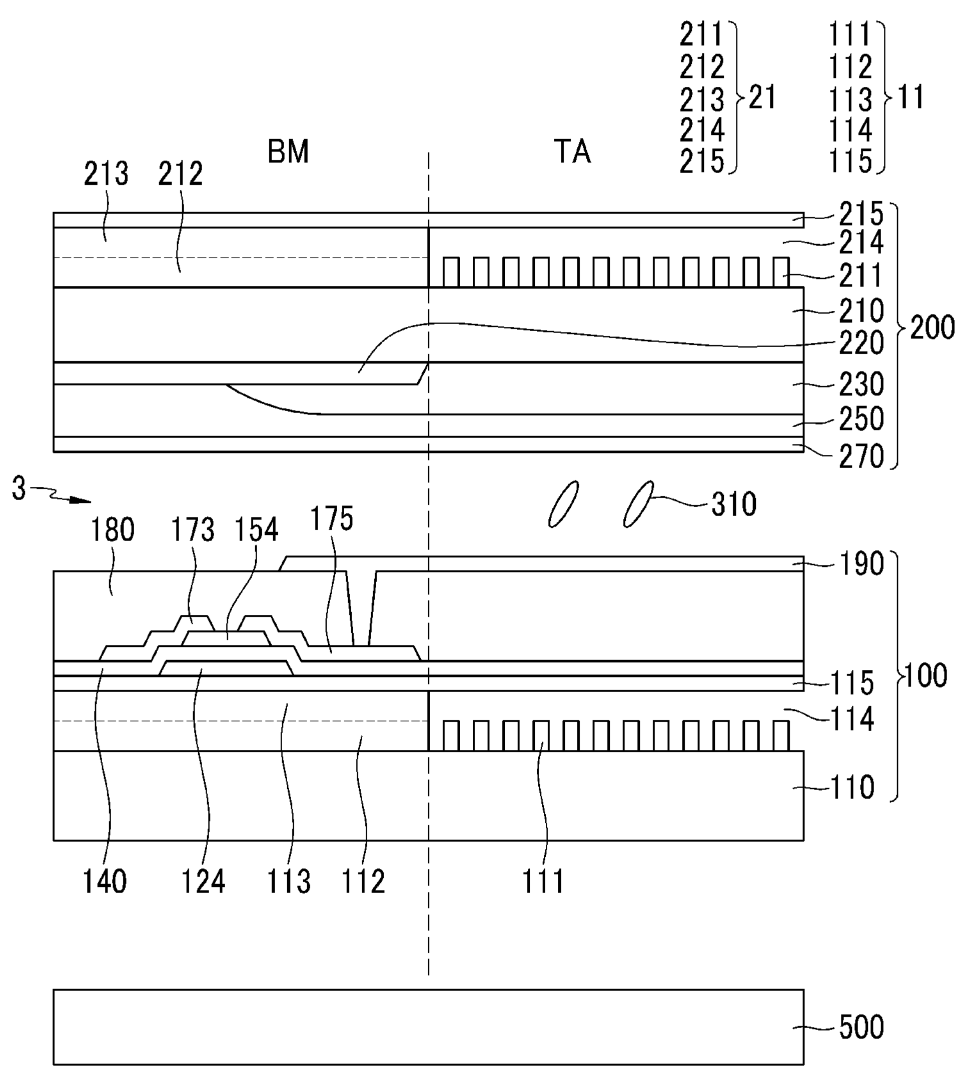
FIG. 1 is a cross-sectional view of an exemplary embodiment of a liquid crystal display according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. As used herein, the term "and/or" includes any and all combinations of one or more of the associated listed items. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Both a transmissive liquid crystal display ("LCD") and a transflective LCD display an image using an internal light source such as a backlight. Even though a display luminance of the transmissive LCD and the transflective LCD is high, a portion of light generated form the backlight and incident on a display panel of the LCD, such as about 50% of the light, may be undesirably absorbed by a polarizer attached on a lower portion of the LCD. A remaining portion, such as about 50% or so of the light, is used for image display, degrading the light efficiency and the display luminance of the LCD. Therefore, there remains a need for an improved LCD having high display luminance and light efficiency.

Hereinafter, the invention will be described in detail with reference to the accompanying drawings.

Now, an exemplary embodiment of a LCD according to the invention will be described with reference to FIG. 1.

FIG. 1 is a cross-sectional view of an exemplary embodiment of a LCD according to the invention.

The exemplary embodiment of the LCD includes a backlight unit 500 and a liquid crystal panel.

Firstly, the backlight unit 500 may include a light source, a light guide, a reflector and an optical sheet, which are integrally formed as illustrated in FIG. 1. The light provided from the light source is provided to the liquid crystal panel upward through the light guide, the reflector and the optical sheet. According to an exemplary embodiment, a luminance-improved film in which two layers having different refractive indexes are repeatedly deposited may not be included among the optical sheet, but the invention is not limited thereto or thereby.

The liquid crystal panel includes a liquid crystal layer 3, a lower panel 100 and an upper panel 200 as shown in FIG. 1. The lower panel 100 may include a lower insulation substrate 110 and the upper panel 200 may include an upper insulation substrate 210. A liquid crystal cell may be defined between or by the lower and upper insulation substrates 110 and 210, but is not limited thereto or thereby.

Firstly, the lower panel 100 will be described.

A lower polarizer 11 is disposed on the lower insulation substrate 110. The lower insulation substrate 110 may include transparent glass or plastic.

The lower polarizer 11 is a reflective polarizer, and includes an opening TA defined therein, in which a plurality of metal lines 111 are disposed and through which light is transmitted, and a non-opening BM in which plate-type patterns 112 and 113 are disposed and through which the light is not transmitted, but is instead reflected. Each of the plate-type patterns 112 and 113, or a collective unit of the plate-type patterns 112 and 113, may be a single, unitary, indivisible member, but is not limited thereto or thereby.

The plurality of metal lines 111 disposed in the opening TA have a longitudinal axis which extends in one direction (e.g., a first direction), and are separated from each other with a predetermined interval in a different direction than the one direction (e.g., a second direction). The interval between the metal lines 111 is smaller than a wavelength of visible rays, and may be several tens or hundreds of nanometers in width. In the exemplary embodiment, the width of the metal line 111 may be various, and corresponds to the interval between the metal lines 111.

A thickness of the metal lines 111 may be changed according to a material of the metal lines 111, and may be several tens or hundreds of nanometers. In one exemplary embodiment, the thickness is three times the width of the metal lines 111. As described above, when a plurality of metal lines 111 are arranged in the second direction, the light perpendicular to the second direction may be transmitted and the light parallel to the second direction may be reflected.

The plate-type patterns 112 and 113 disposed in the non-opening BM have a larger height than that of the plurality of metal lines 111. A total height of the plate-type patterns 112 and 113 include a plate-type metal pattern 112 and the height of an additional plate-type pattern 113 disposed on the plate-type metal pattern 112. The heights may be taken from a common reference point or surface, such as an upper surface of the lower insulation substrate 110.

The plate-type metal pattern 112 includes a metal such as the metal of the metal line 111, such that the light that is incident downward in the LCD is reflected. The plate-type metal pattern 112 may have the same height as the metal line 111. The non-opening BM in which the plate-type metal pattern 112 is disposed may accord with a region where a light blocking member 220 is disposed in the liquid crystal panel, and an opening which is defined in the light blocking member 220 may accord with the opening TA where the plurality of metal lines 111 are disposed. The plurality of metal lines 111 may include the same metal as the plate-type metal pattern 112, or may include a different metal according to an alternative exemplary embodiment.

The additional plate-type pattern 113 is disposed on the plate-type metal pattern 112, and the additional plate-type pattern 113 may include a metal or a dielectric material. The dielectric material may include a material such as TiO2 or SiO2, a highly reflective material or an anti-reflective material. The metal of the plate-type pattern 113 generally has a highly reflective characteristic, however, a metal such as chromium (Cr), molybdenum (Mo), and titanium (Ti) may have a reflective characteristic when the plate-type pattern 113 has a dual-layered structure including the metal layer and an oxide layer.

When the additional plate-type pattern 113 has the highly reflective characteristic, the additional plate-type pattern 113 reflects the light incident thereon from above, thereby improving light recycle efficiency, and the additional plate-type pattern 113 may be positioned toward the backlight unit 500. Alternatively, when the additional plate-type pattern 113 has the anti-reflective characteristic, the light is not reflected such that the display characteristic of the display device is improved, and thereby the additional plate-type pattern 113 may be positioned toward the eyes of a user. When the additional plate-type pattern 113 includes the metal, the additional plate-type pattern 113 may include the same metal as that of the plate-type metal pattern 112, or may include a different metal according to an alternative exemplary embodiment. The additional plate-type pattern 113 may be a dual layer (e.g., two layers) or more layers (e.g., more than two layers).

On the plurality of metal lines 111 disposed in the opening TA, a transparent region 114 is defined between a portion corresponding to the additional plate-type pattern 113 and the metal line 111. The transparent region 114 may be filled with air. According to an exemplary embodiment, the transparent region 114 may be filled with a material having a refractive index corresponding to that of air.

An opposing insulating layer 115 is disposed on the additional plate-type pattern 113 and on the transparent region 114. The opposing insulating layer 115 contacts the additional plate-type pattern 113 of the collective plate-type patterns 112 and 113, however, the opposing insulating layer 115 does not contact the plurality of metal lines 111. That is, the opposing insulating layer 115 is separated from the plurality of metal lines 111 by a predetermined distance.

As described above, the lower polarizer 11 includes the metal line 111, the plate-type pattern 112 and 113, the transparent region 114 and the opposing insulating layer 115, above the lower insulation substrate 110. The lower insulation substrate 110 and the opposing insulating layer 115 are used to support the remaining elements of the lower polarizer 11 at both of opposing sides thereof, and to protect the remaining elements. The opposing insulating layer 115 may not be considered as a part of the lower polarizer 11, such that elements of the lower polarizer 11 are between the supporting opposing insulating layer 115 and lower insulation substrate 110.

However, in an alternative exemplary embodiment, elements of lower the polarizer 11 may be sufficiently supported without a separate supporting member, such that it is not necessary to use an insulation substrate or an insulating layer for support. That is, the lower polarizer 11 may be separately manufactured with a film shape in which the metal line 111, the plate-type patterns 112 and 113, and the transparent region 114 are subsequently disposed between the supporting members. In an exemplary embodiment of manufacturing the LCD, the lower polarizer 11 may be attached to the lower insulation substrate 110 after being separately formed with the film shape, or the lower polarizer 11 may be formed on the insulation substrate 110 through a deposition and/or etching process such used to form the thin film transistor.

Also, for the lower polarizer 11, upper and lower positions of the metal line 111, the plate-type patterns 112 and 113, and the transparent region 114 positioned between the supporting members may be changed according to an exemplary embodiment. That is, as shown in FIG. 1, the metal lines 111 and the plate-type metal pattern 112 are positioned at the lower side of the lower polarizer 11 and the transparent region 114 and the additional plate-type pattern 113 are positioned at the upper side. However, referring to similar elements in an upper polarizer 21 of FIG. 21, the transparent region 114 and the additional plate-type pattern 113 may be positioned at the lower side, and the metal lines 111 and the plate-type metal pattern 112 may be positioned at the upper side.

The lower polarizer 11 shown in FIG. 1 is disposed on the lower insulation substrate 110 thereby presenting an exemplary embodiment in which the lower polarizer 11 is considered an in-cell type. That is, since the lower polarizer 11 is on an inner side of the lower insulation substrate 110 and thereby within the liquid crystal cell, the lower polarizer 11 shown in FIG. 1 is considered an in-cell type.

According to an exemplary embodiment, different from the lower polarizer 11 of FIG. 1, elements of the lower polarizer 11 may be disposed under the insulation substrate 110 and be considered an on-cell type. That is, since the lower polarizer 11 would be on an outer side of the lower insulation substrate 110 and thereby outside of the liquid crystal cell, the lower polarizer 11 of the exemplary embodiment different from the lower polarizer 11 of FIG. 1 is considered an on-cell type. In this on-cell type of lower polarizer 11, the upper and lower arrangement of the metal lines 111, the plate-type pattern 112 and 113, and the transparent region 114 is not changed, however the opposing insulating layer 115 may perform a function of supporting and protecting the lower portion of the lower polarizer 11 by being positioned at the lowest side of the lower polarizer 11. In detail, the on-cell type lower polarizer 11 includes a plurality of metal lines 111 and the plate-type patterns 112 and 113 are positioned above the opposing insulating layer 115, the transparent region 114 is positioned above the plurality of metal lines 111, and the lower insulation substrate 110 is positioned above the additional plate-type pattern 113 of the plate-type patterns and the transparent region 114. As described above, in the lower polarizer 11, the positions of the lower insulation substrate 110 as the supporting member and the opposing insulating layer 115 may be changed. In both the in-cell and on-cell type lower polarizer 11, the metal lines 111 may be positioned lower than the transparent region 114, that is, closer to the backlight unit 500, to receive the light from the backlight unit 500 earlier than the transparent region 114, but the invention is not limited thereto or thereby.

However, according to an alternative exemplary embodiment, although the metal lines 111 are positioned under the lower insulation substrate 110, the metal lines 111 may be disposed to contact a lower surface of the lower insulation substrate 110, and the transparent region 114 may receive the light from the backlight unit 500 earlier than the plurality of metal lines 111.

A thin film transistor and a pixel electrode are disposed on the lower polarizer 11 of the lower panel 100. The thin film transistor and the pixel electrode may have various structures according to an exemplary embodiment and will be described through a simple structure.

One or more gate line, and one or more gate electrode 124 receiving a gate voltage from the gate line, are disposed on the opposing insulating layer 115 of the lower polarizer 11. A plurality of the gate lines has a longitudinal axis which mainly extends in a transverse direction, and a plurality of gate electrodes 124 may respectively protrude from the gate lines.

A gate insulating layer 140 including silicon nitride (SiNx) or silicon oxide (SiOx) is disposed on the gate line and the gate electrode 124.

A semiconductor 154 including hydrogenated amorphous silicon (a-Si), polysilicon, etc. is disposed on the gate insulating layer 140. The semiconductor 154 is disposed above the gate electrode 124, and forms a channel of the thin film transistor.

One or more data line, and one or more drain electrode 175 is disposed on the semiconductor 154 and on the gate insulating layer 140.

A plurality of data lines transmits a data voltage and has a longitudinal axis which mainly extends in a longitudinal direction different from the transverse direction, thereby intersecting the gate lines. A data line includes a plurality of source electrodes 173 extending toward the gate electrode 124. The drain electrode 175 is separated from the data line, and faces the source electrode 173 with respect to the gate electrode 124.

One gate electrode 124, one source electrode 173 and one drain electrode 175 form a thin film transistor ("TFT") together with the semiconductor 154. A channel of the thin film transistor is formed by a portion of the semiconductor 154 exposed between the source electrode 173 and the drain electrode 175.

On the semiconductor 154, a plurality of ohmic contacts (not shown) may be disposed between the source electrode 173 and the drain electrode 175.

A passivation layer 180 is disposed on the data line, the drain electrode 175 and the exposed semiconductor 154. The passivation layer 180 includes an inorganic insulator or an organic insulator, and may have a substantially flat or planar surface. Examples of the inorganic insulator include silicon nitride and silicon oxide. The organic insulator may have a dielectric constant of less than 4.0, and photosensitivity. Also, the passivation layer 180 may have a dual-layer structure including a lower inorganic layer and an upper organic layer.

A contact hole is defined in the passivation layer 180 and exposes one end of the drain electrode 175.

One or more pixel electrode 190 is disposed on the passivation layer 180. The pixel electrode 190 may include a transparent conductive material such as indium tin oxide ("ITO") or indium zinc oxide ("IZO").

The pixel electrode 190 is physically and electrically connected to the drain electrode 175 through the contact hole defined in the passivation layer 180, thereby receiving the data voltage from the drain electrode 175. The pixel electrode 190 to which the data voltage is applied generates an electric field together with a common electrode 270 to which a common voltage is applied, to determine the direction of liquid crystal molecules 310 in the liquid crystal layer 3 between the pixel electrode 190 and the common electrode 270. Polarization of light passing through the liquid crystal layer 3 varies depending on the determined direction of the liquid crystal molecules 310. The pixel electrode 190 and the common electrode 270 form capacitors (hereinafter referred to as liquid crystal capacitors) to sustain the applied voltage even after the TFTs are turned off.

An alignment layer (not shown) may be disposed on the pixel electrode 190.

Hereinafter, the upper panel 200 will be described.

An upper polarizer 21 is disposed on the upper insulation substrate 210 which includes transparent glass or plastic.

The upper polarizer 21 is a reflective polarizer, and includes an opening TA defined therein, in which a plurality of metal lines 211 are disposed and through which light is transmitted, and a non-opening BM in which plate-type patterns 212 and 213 are disposed and through which the light is not transmitted, but is reflected.

The plurality of metal lines 211 disposed in the opening TA has a longitudinal axis which extends in one direction (e.g., the first direction), and are separated with a predetermined interval in a different direction than the first direction (e.g., the second direction). The interval between the metal lines 211 is smaller than a wavelength of visible rays and may be several tens or hundreds of nanometers in width. In the exemplary embodiment, the width of the metal line 211 may be various, and corresponds to the interval between the metal lines 211.

A thickness of the metal line 211 may be changed according to a material of the metal lines 211, and may be several tens or hundreds of nanometers. In one exemplary embodiment, the thickness is three times the width of the metal lines 211. As described above, when a plurality of metal lines 211 are arranged in the second direction, the light perpendicular to the second direction may be transmitted and the light parallel to the second direction may be reflected.

The plate-type patterns 212 and 213 disposed in the non-opening BM have a larger height than the plurality of metal lines 211. A total height of the plate-type patterns 212 and 213 include a plate-type metal pattern 212, and an additional plate-type pattern 213 disposed on the plate-type metal pattern 212.

The plate-type metal pattern 212 includes a metal such as the metal of the metal lines 211, such that the light incident from the liquid crystal layer 3 toward the upper panel 200 is reflected and blocked. The plate-type metal pattern 212 may have the same height as the metal lines 211. The non-opening BM in which the plate-type metal pattern 212 is disposed may accord with a region where the light blocking member 220 is disposed in the liquid crystal panel, and an opening of the light blocking member 220 may accord with the opening TA in which the plurality of metal lines 211 is disposed. The plurality of metal lines 211 may include the same metal as that of the plate-type metal pattern 212, or may include a different metal according to an alternative exemplary embodiment.

The additional plate-type pattern 213 is disposed on the plate-type metal pattern 212, and the additional plate-type pattern 213 may include a metal or a dielectric material. The dielectric material may include a material such as TiO2 or SiO2, a highly reflective material or an anti-reflective material. The metal generally has a highly reflective characteristic, however, the metal such as chromium (Cr), molybdenum (Mo), and titanium (Ti) may have the reflective characteristic when the plate-type pattern 213 has a dual-layered structure including the metal layer and an oxide layer.

When the additional plate-type pattern 213 has the highly reflective characteristic, the additional plate-type pattern 213 reflects the light incident thereon from below, thereby improving light recycle efficiency. Referring again to the similar elements of FIG. 21, the additional plate-type pattern 213 may be positioned toward the liquid crystal layer 3 and the backlight unit 500. However, as shown in FIG. 1, when the additional plate-type pattern 213 is positioned toward a display side of the display panel, that is, closer to the user, the additional plate-type pattern 213 may include the metal or have the highly reflective characteristic.

Also, when the additional plate-type pattern 213 has the anti-reflective characteristic, the light is not reflected such that the display characteristic of the display device is improved, and thereby the additional plate-type pattern 213 may be positioned toward the eyes of the user like in FIG. 1. In the exemplary embodiment of FIG. 1, when the additional plate-type pattern 213 of the upper polarizer 21 includes the dielectric material with the anti-reflective characteristic, a non-reflection film such as an anti-glare film (not shown) disposed outside the upper panel 200 may not be used.

The additional plate-type pattern 213 may have a dual layer structure (e.g., two layers) or more layers (e.g., more than two layers).

When the additional plate-type pattern 213 includes the metal, the additional plate-type pattern 213 may include the same metal as the plate-type metal pattern 212, or may include a different metal according to an alternative exemplary embodiment.

On the plurality of metal lines 211 disposed in the opening TA, a transparent region 214 is defined between a portion corresponding to the additional plate-type pattern 213 and the metal lines 211. The transparent region 214 may be filled with air. According to exemplary embodiment, the transparent region 214 may be filled with a material having a refractive index corresponding to air.

An opposing insulating layer 215 is disposed on the additional plate-type pattern 213 and on the transparent region 214. The opposing insulating layer 215 contacts the additional plate-type pattern 213 of the plate-type patterns 212 and 213, however, the opposing insulating layer 215 does not contact the plurality of metal lines 211. That is, the opposing insulating layer 215 is separated from the plurality of metal lines 211 by a predetermined distance.

As described above, the upper polarizer 21 includes the metal lines 111, the plate-type patterns 212 and 213, the transparent region 214 and the opposing insulating layer 215 below the upper insulation substrate 210. The upper insulation substrate 210 and the opposing insulating layer 215 are used to support the remaining elements of the upper polarizer 21 at both of opposing sides and to protect the remaining elements. The opposing insulating layer 215 may not be considered as a part of the upper polarizer 21, such that elements of the upper polarizer 21 are between the supporting opposing insulating layer 215 and lower insulation substrate 210

However, an alternative exemplary embodiment, elements of the upper polarizer 21 may be sufficiently supported without a supporting member, such that it is not necessary to use an insulation substrate or an insulating layer. That is, the upper polarizer 21 may be separately formed with the film shape including the metal lines 211, the plate-type patterns 212 and 213, and the transparent region 214, and may be subsequently attached on or between the supporting members.

The metal lines 211, the plate-type patterns 212 and 213, the transparent region 214 of the upper polarizer 21, and the metal lines 111, the plate-type patterns 112 and 113, and the transparent region 114 of the lower polarizer 11 may respectively include the same materials.

The upper polarizer 21 shown in FIG. 1 is disposed above the upper insulation substrate 210 and is considered an on-cell type. That is, since the upper polarizer 21 is on an outer side of the upper insulation substrate 210 and thereby outside of the liquid crystal cell, the upper polarizer 21 shown in FIG. 1 is considered an on-cell type. However, different from FIG. 1, again referring to FIG. 21, the upper polarizer 21 may be positioned under the upper insulation substrate 210 thereby being considered an in-cell type. That is, since the upper polarizer 21 would be on an inner side of the upper insulation substrate 210 and thereby inside of the liquid crystal cell, the upper polarizer 21 of the exemplary embodiment different from the upper polarizer 21 of FIG. 1 is considered an in-cell type. In this in-cell type upper polarizer 21, the upper and lower arrangement of the metal lines 211, the plate-type patterns 212 and 213, and the transparent region 214 are not changed from that of FIG. 1, however, the opposing insulating layer 215 may perform a function of supporting and protecting the lower portion by being positioned at the lowest side of the upper polarizer 21. In detail, this in-cell type upper polarizer 21 includes the plurality of metal lines 211 and the plate-type patterns 212 and 213 are positioned above the opposing insulating layer 215, the transparent region 214 is positioned above the plurality of metal lines 211, and the upper insulation substrate 210 is positioned above the additional plate-type pattern 213 of the plate-type patterns 212 and 213 and the transparent region 214. As described above, in the upper polarizer 21, the positions of the upper insulation substrate 210 as the supporting member and the opposing insulating layer 215 may be changed. In both the in-cell and on-cell type upper polarizer 21, the metal lines 211 are positioned lower than the transparent region 214, that is, closer to the liquid crystal layer 3, such that the light from the liquid crystal layer 3 and the backlight unit 500 may be applied to the metal lines 211 earlier than to transparent region 214.

The light blocking member 220, the color filter 230 and the common electrode 270 are disposed under the upper insulation substrate 210 of the upper panel 200 according to the exemplary embodiment of FIG. 1. According to an exemplary embodiment, at least one of the light blocking member 220, the color filter 230 and the common electrode 270 may be disposed in the lower panel 100, and an exemplary embodiment in which all three elements are disposed in the lower panel 100 is possible. A structure under the upper insulation substrate 210 of the upper panel 200 of FIG. 1 will now be described.

A light blocking member 220 is disposed under the upper insulation substrate 210. The light blocking member 220 is referred to as a black matrix and prevents light leakage. The light blocking member 220 faces the pixel electrode 190. The light blocking member 220 includes a first portion corresponding to the gate line and the data line, and a second portion corresponding to the thin film transistor, thereby preventing the light leakage between adjacent pixel electrodes 190. An opening is defined in the light blocking member 220 (indicated by "TA" in FIG. 1) corresponding to the pixel electrode 190, and the opening defined in the light blocking member 220 accords with the openings of the upper polarizer 21 and the lower polarizer 11. Also, the region (indicated by "BM" of FIG. 1) in which the light blocking member 220 is disposed accords with the non-opening BM of the upper polarizer 21 and the lower polarizer 11.

One or more color filter 230 is disposed under the upper insulation substrate 210 and the light blocking member 220. The color filter 230 covers the opening of the light blocking member 220 and may have a longitudinal axis which extends in the longitudinal direction. Each color filter 230 of a plurality of color filters 230 may display one of primary colors such as three primary colors of red, green and blue, but is not limited thereto or thereby.

An overcoat 250 is disposed under the color filter 230 and the light blocking member 220. The overcoat 250 may include an (organic) insulator, prevents the color filter 230 from being exposed and provides a substantially flat surface of the upper panel 200. In an alternative exemplary embodiment, the overcoat 250 may be omitted.

The common electrode 270 is disposed under the overcoat 250. The common electrode 270 includes a transparent conductor such as ITO or IZO.

An alignment layer (not shown) may be disposed under the common electrode 270.

The liquid crystal layer 3 is disposed between the upper panel 200 and the lower panel 100.

The liquid crystal layer 3 includes the liquid crystal molecules 310 having dielectric anisotropy. The liquid crystal molecules 310 may be aligned perpendicular or parallel to the surface of the two display panels 100 and 200 in the absence of an electric field. The alignment direction of the liquid crystal molecules 310 is changed by the electric field formed by voltages applied to the pixel electrode 190 and the common electrode 270.

Next, a structure of an exemplary embodiment of a polarizer according to the invention will be described with reference to FIG. 2.

Figure 2:
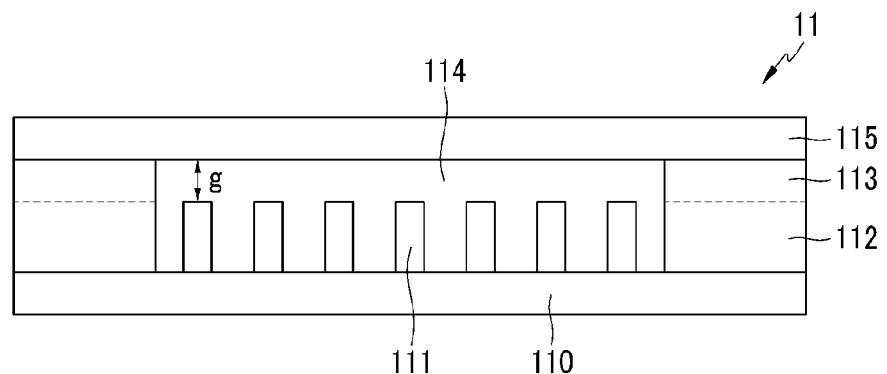
FIG. 2 is an enlarged cross-sectional view of an exemplary embodiment of a polarizer according to the invention.

FIG. 2 is an enlarged cross-sectional view of an exemplary embodiment of a polarizer according to the invention, while focusing the lower polarizer 11 shown in FIG. 1. However, related elements of the upper polarizer 21 shown in FIG. 1 may be the same as those described with reference to FIG. 2, and a repetitive description is omitted for convenience.

The reflective polarizer shown in FIG. 2 includes a plurality of metal lines 111 disposed in the opening TA, and the plate-type patterns 112 and 113 disposed in the non-opening BM. Also, in the opening TA, the plurality of metal lines 111 is covered by the transparent region 114.

As described above, the lower insulation substrate 110 and the opposing insulating layer 115 shown in FIG. 2 are used as the supporting member of remaining elements of the polarizer 11. However, the invention is not limited to the illustrated exemplary embodiment.

The plurality of metal lines 111 disposed in the opening TA are elongated in one direction (e.g., a first direction) and are separated from each other with a predetermined interval therebetween in the opening TA in another direction different than the one direction (e.g., a second direction). The interval between adjacent metal lines 111 is smaller than a wavelength of visible rays, and is several tens or hundreds of nanometers in width. A width of a metal line 111 may be various and correspond to the interval between the metal lines 111. A thickness of the metal lines 111 may be changed according to a material of the metal lines 111, and may be several tens or hundreds of nanometers. In an exemplary embodiment, the thickness may be three times the width of the metal lines 111, but is not limited thereto or thereby.

A height of the plate-type metal pattern 112 in the non-opening BM is the same as a height of the metal lines 111 in the opening TA, and may include the same material as the metal lines 111.

In a cross-sectional direction, the metal lines 111 are not positioned the region in which the additional plate-type pattern 113 is positioned. The transparent region 114 is defined in the cross-sectional region where the metal line 111 is not positioned, and in a region between adjacent metal lines 111 in the second direction. The additional plate-type pattern 113 may include the metal or the dielectric material. The dielectric material may include the material such as TiO2 or SiO2, and may have the highly reflective characteristic or the anti-reflective characteristic. The additional plate-type pattern 113 may have dual layers or more than dual layers.

Where a lower polarizer reflects the light provided from the backlight unit 500, the additional plate-type pattern 113 shown in FIG. 2 may include the dielectric material having the highly reflective characteristic, and where an upper polarizer blocks the light from outside the LCD, the additional plate-type pattern 113 shown in FIG. 2 may include the dielectric material having the anti-reflective characteristic. When the additional plate-type pattern 113 having the anti-reflective characteristic is used in the upper polarizer, an anti-reflective film such as an anti-glare film attached to the upper panel 200 may be omitted.

The transparent region 114 may be filled with air without any other material, and alternatively, the transparent region 114 may be filled with the transparent insulating material. The transparent insulating material may be used as the material having the refractive index corresponding to that of air.

As shown in FIG. 2, the opposing insulating layer 115 and the metal lines 111 are separated by a distance "g". The distance "g" is a thickness of the additional plate-type pattern 113 taken in the cross-sectional direction.

The structure shown in FIG. 2 is a basic structure of an exemplary embodiment of a polarizer according to the invention. It will be understood that various elements may be used as the supporting member of the polarizer, as well as the insulation substrate and/or the insulating layer shown in FIG. 2, while still achieving a film-shaped polarizer of the invention.

In the lower polarizer 11, the metal lines 111 may be disposed to be closer to the backlight unit 500 than the transparent region 114.

Figure 3:
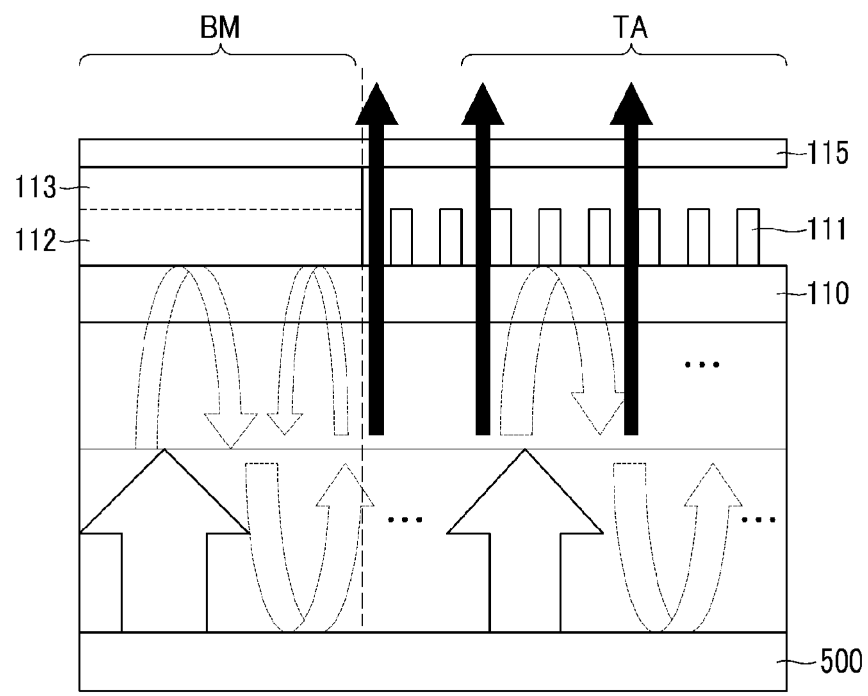
FIG. 3 is a view showing light that is reflected or transmitted in an exemplary embodiment of a polarizer according to the invention.

FIG. 3 shows a reflection and transmission characteristics of light in an exemplary embodiment of a polarizer according to the invention.

FIG. 3 is a view showing light that is reflected or transmitted in an exemplary embodiment of a polarizer according to the invention.

As shown in FIG. 3, the light incident to the non-opening BM of the lower polarizer 11 is totally reflected by the plate-type metal pattern 112. The reflected light is again reflected through a reflection sheet of the backlight unit 500, and then is again incident to the lower polarizer 11. At this time, while the light path of the incident light is changed, the light is eventually incident to the opening TA of the lower polarizer 11 such that the light efficiency of the polarizer is improved.

When the thickness of the plate-type metal pattern 112 is sufficient, the light incident to the non-opening BM is totally reflected. However, when the thickness of the plate-type metal pattern 112 is thin and not sufficient, the light may partially progress upward and not be totally reflected. Where the thickness of the plate-type metal pattern 112 is thin only a portion of incident light is reflected into the backlight unit 500, when the additional plate-type pattern 113 includes the dielectric material having the highly reflective characteristic, a remaining portion of the incident light is also reflected into the backlight unit 500 thereby improving the reflection efficiency.

Among the light incident to the opening TA of the lower polarizer 11, the light having the polarization axis of the direction perpendicular to the arrangement direction that the plurality of metal lines 111 is transmitted, and the light perpendicular to the arrangement direction is reflected.

The light reflected by the plurality of metal lines 111 is again reflected by the reflection sheet of the backlight unit 500, to again be incident into the opening TA of the lower polarizer 11. In this process, only the light of which the polarization direction is changed is transmitted, and as a result, the amount of light used to eventually pass through the opening TA is increased.

As shown in FIG. 3, the lower polarizer 11 both reflects and transmits the incident light such that the light recycling is possible. As a result, a luminance improvement film (e.g., a film of which two layers having the different refractive index are repeatedly deposited) that is generally used in the backlight unit 500, may be omitted.

Next, a method of manufacturing an exemplary embodiment of a polarizer according to the invention will be described with reference to FIG. 4 to FIG. 11.

FIG. 4 to FIG. 11 are views sequentially showing an exemplary embodiment of a manufacturing method of a polarizer according to the invention.

Figure 4:
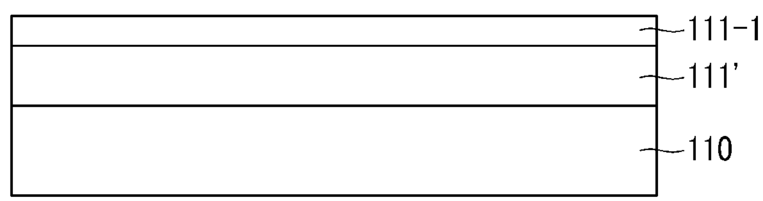
FIG. 4 to FIG. 11 are views sequentially showing an exemplary embodiment of a manufacturing method of a polarizer according to the invention.

As shown in FIG. 4, a metal layer 111' including a metal for forming the metal line 111 and the plate-type metal pattern 112, is deposited (e.g., provided) on the supporting member (e.g., the lower insulation substrate 110). Next, a material 111-1 for a hard mask is deposited on the metal layer 111'.

Figure 5:
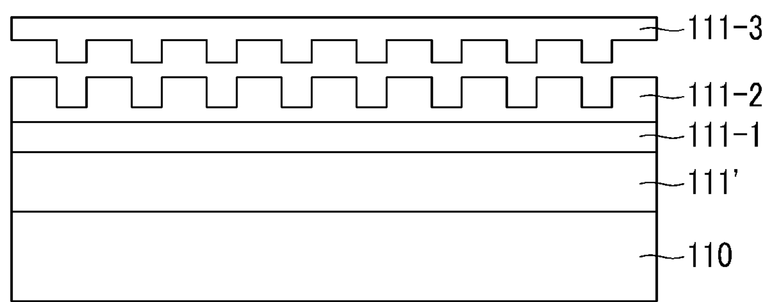

Next, as shown in FIG. 5, a polymer 111-2 is positioned on the material 111-1 for the hard mask, and is compressed by using a mold 111-3 to form a linear pattern in the polymer 111-2. The linear pattern may include a plurality of linear portions elongated in a first direction, and separated from each other in a second direction different than the first direction, such as perpendicular to the first direction. However, the linear pattern as a pattern to form the metal line 111 may have a smaller interval than the wavelength of the visible rays. The linear pattern is engraved in the mold 111-3. In an exemplary embodiment of the mold 111-3, the linear pattern is engraved in all regions of the mold 111-3 without a division of the opening TA and the non-opening BM. As a result, the polymer 111-2 also includes the linear pattern on a whole region thereof without a division of the opening TA and the non-opening BM.

Figure 6:
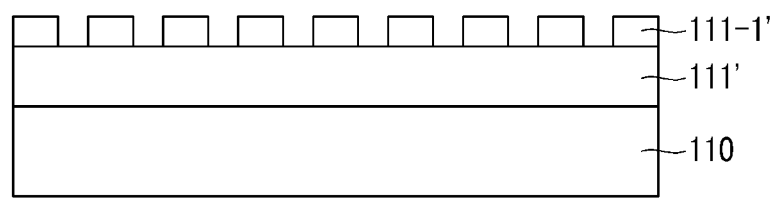

Next, as shown in FIG. 6, the material 111-1 for the hard mask is patterned using the polymer 111-2 having the linear pattern as a mask, to form a hard mask pattern 111-1'. Accordingly, the hard mask pattern 111-1' includes the linear pattern.

Figure 7:
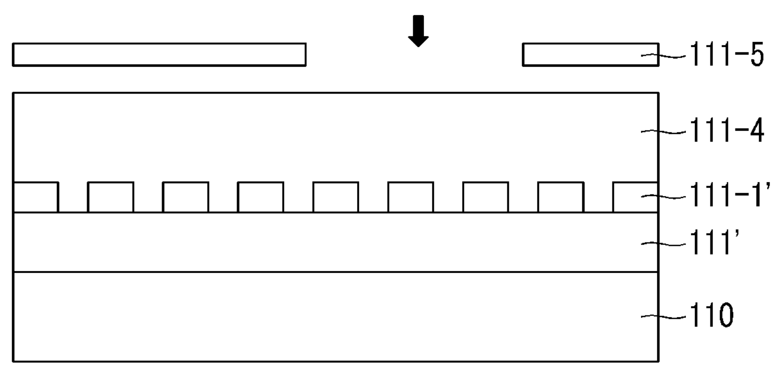
Figure 8:
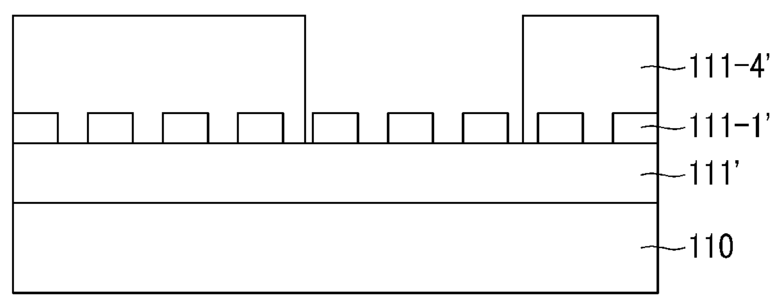

Next, as shown in FIG. 7, a photoresist 111-4 is deposited on the metal layer 111' and on the hard mask pattern 111-1'. The photoresist 111-4 is exposed by using a mask 111-5. Here, the mask 111-5 is the same mask as that used when forming the light blocking member 220. The photoresist 111-4 is developed to leave a photoresist pattern 111-4' as shown in FIG. 8. In the photoresist pattern 111-4' of FIG. 8, the photoresist 111-4 formed in the non-opening BM is removed, and the photoresist 111-4 formed in the opening TA is a remaining pattern. Here, the photoresist pattern 111-4' that remains through the developing has the same plane pattern as the light blocking member 220. According to an exemplary embodiment, the exposed hard mask pattern 111-1' may also be removed.

Figure 9:
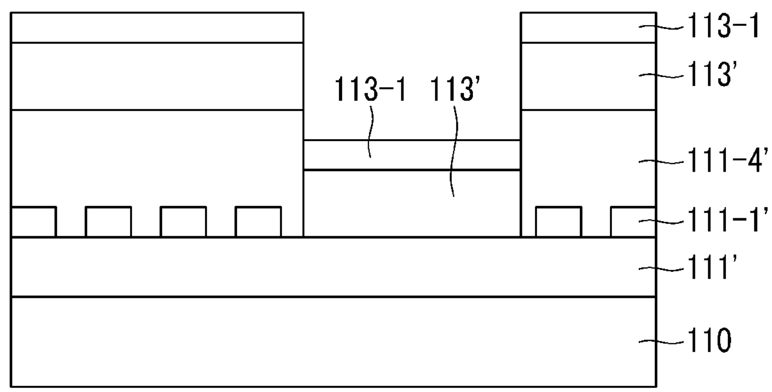

Next, as shown in FIG. 9, a material 113' for an additional plate-type pattern 113 and a material 113-1 for a second hard mask are sequentially deposited.

Figure 10:
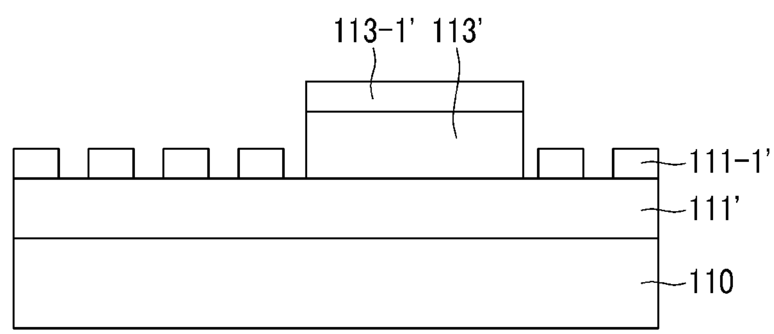

Next, as shown in FIG. 10, the photoresist pattern 111-4' is removed through a lift-off method. As a result, the material 113' for an additional plate-type pattern 113 and the material 113-1 for the second hard mask that was formed on the photoresist pattern 111-4' are removed together with the photoresist pattern 111-4'. That is, the material 113' for an additional plate-type pattern 113 and the material 113-1 for the second hard mask remains only in the non-opening BM where the photoresist pattern 111-4' is not formed, and the material 113' for an additional plate-type pattern 113 and the material 113-1 for the second hard mask are removed in the opening TA. Through this process, a second hard mask pattern 113-1' is completed.

Figure 11:
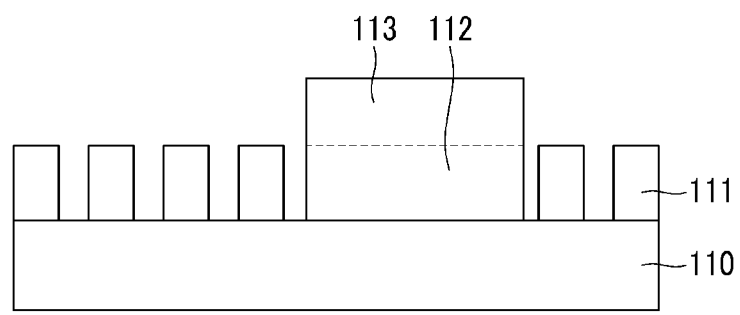

Next, as shown in FIG. 11, by using the hard mask pattern 111-1' and the second hard mask pattern 113-1' as a mask, the metal layer 111' for the metal line 111 and the material 113' for the additional plate-type pattern 113 are etched to form a plurality of metal lines 111, the plate-type metal pattern 112 and the additional plate-type pattern 113. The plate-type metal pattern 112 may be formed from the same metal layer 111' used to form the metal lines 111.

Next, referring back to FIG. 2, the supporting member (e.g., the opposing insulating layer 115) is disposed to cover the metal lines 111, the plate-type metal pattern 112 and the additional plate-type pattern 113 and complete the polarizer.

The above-described method of manufacturing the polarizer may be performed together or with processes for forming the LCD. That is, for example, the polarizer is formed by the above-described method on the insulation substrate, a thin film transistor, a pixel electrode, a light blocking member, a color filter and a common electrode are formed on the polarizer to complete upper and lower display panels, and then a liquid crystal layer is injected between the display panel to complete the LCD. The polarizer is manufactured by using the same mask used in forming the light blocking member, such that the position where the light blocking member is formed may correspond to the non-opening BM of the polarizer and the opening of the light blocking member may correspond to the opening TA of the polarizer.

Next, characteristics of an exemplary embodiment of a polarizer according to the invention will be described with reference to FIG. 12 to FIG. 19.

Figure 12:
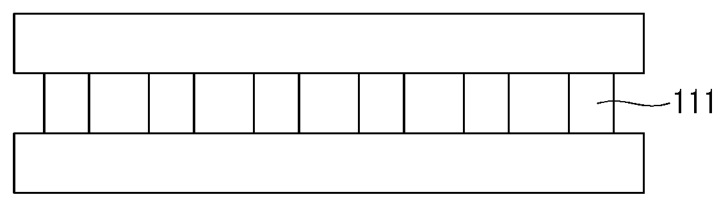
FIG. 12 is a cross-sectional view of a comparative example of a polarizer.
Figure 13:
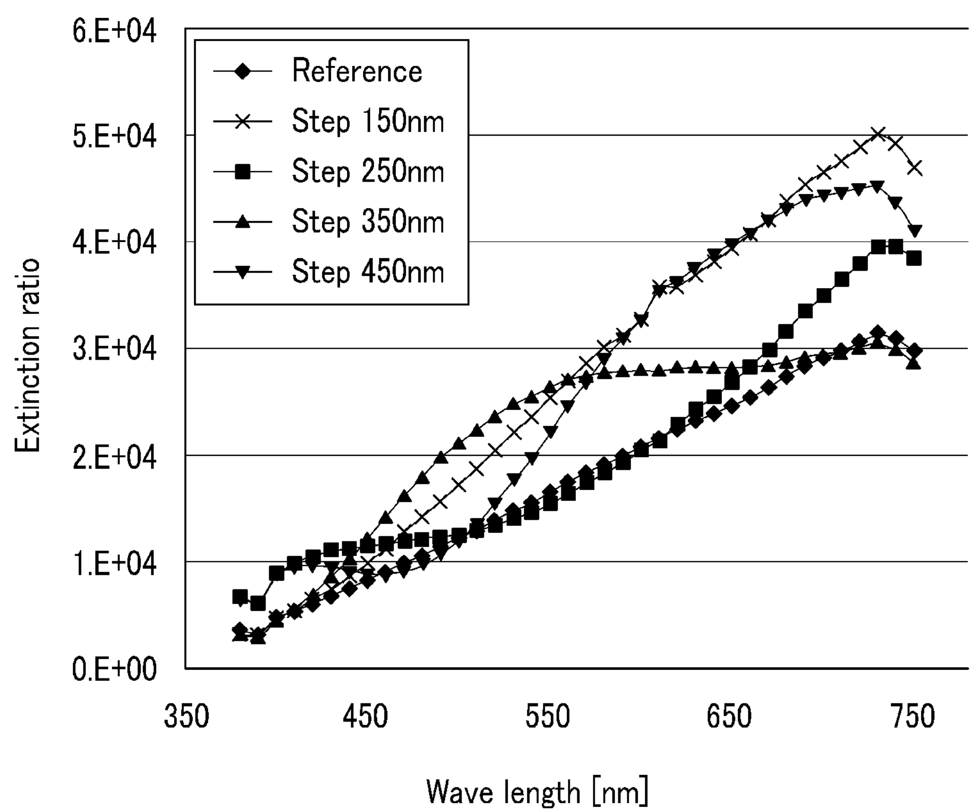
FIG. 13 and FIG. 14 are graphs showing a characteristic of the comparative example of the polarizer and the exemplary embodiment of the polarizer of FIG. 2.
Figure 14:
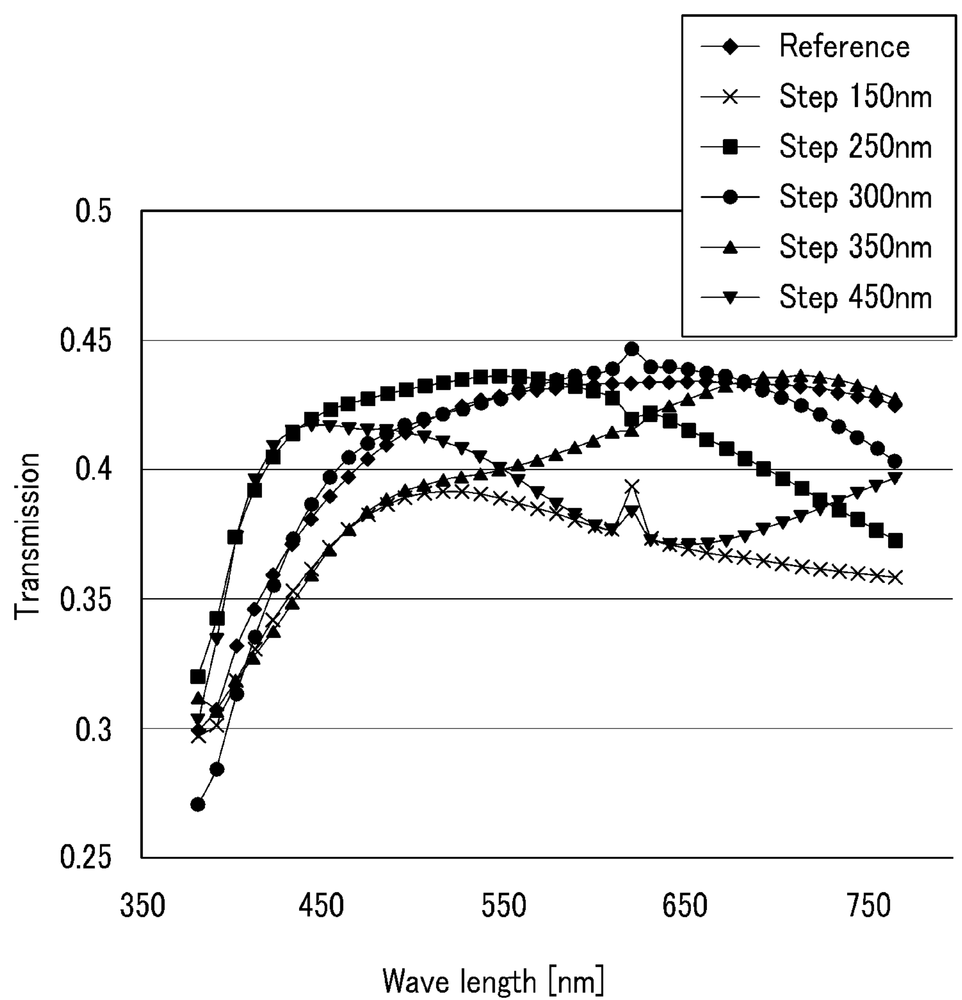

Firstly, a characteristic of an exemplary embodiment of a polarizer according to the invention is compared to that of a comparative example polarizer in FIG. 12 to FIG. 14.

FIG. 12 shows a cross-sectional of the comparative example polarizer.

FIG. 12 is a cross-sectional view of a polarizer used as a comparative example.

As shown in FIG. 12, the metal lines 111 are elongated to extend in one direction, and are separated by an interval which is smaller than the wavelength of the visible rays. However, in the comparative example of FIG. 12, the transparent region 114 of the transmission region TA is not formed as in the exemplary embodiment of the polarizer shown in FIG. 2. As a result, the comparative example polarizer includes both supporting members (unlabeled in FIG. 12) and the metal lines 111 in complete contact with each other.

The comparative example of FIG. 12 is shown as the "Reference" in FIG. 13 and FIG. 14.

Firstly, characteristics of the comparative polarizer and an exemplary embodiment of a polarizer according to the invention are compared through FIG. 13 and FIG. 14.

FIG. 13 and FIG. 14 are graphs respectively showing characteristics of an extinction ratio and transmission of the polarizer according to the comparative example and the exemplary embodiment of the polarizer shown in FIG. 2, with respect to a wavelength of light in nanometers (nm).

FIG. 13 and FIG. 14 show a comparison of the comparative example polarizer and various exemplary embodiments of the polarizer according to a size of the distance "g" in FIG. 2 (indicated as "Step" in units of nm in FIG. 13 and FIG. 14) between the opposing insulating layer 115 and the metal lines 111.

Firstly, the extinction ratio according to the wavelength is shown in FIG. 13. Here, the extinction ratio is a ratio of the light that is removed (e.g., reflected) by the polarizer to the light that is incident on the polarizer. As shown in FIG. 13, as compared with the comparative example polarizer of FIG. 12, it may be confirmed that the ratio of the light that is entirely reflected by exemplary embodiments of the polarizer is similar or higher. When the reflected ratio of a polarizer is lower, it means that the transmittance of that polarizer is improved. That is, it may be confirmed from FIG. 13 that the same characteristics as the comparative example may be obtained by the exemplary embodiments of the polarizer where the interval ("g" in FIG. 2, "Step" in FIG. 13) between the opposing insulating layer 115 and the metal line 111 ranges from 250 nm to 350 nm.

FIG. 14 shows the transmittance according to the wavelength, and in this case, as the transmittance is increased, it may be confirmed that the similar or same characteristic as the comparative example polarizer may be obtained by the exemplary embodiments of the polarizer where the interval ("g" in FIG. 2, "Step" in FIG. 14) ranges between the opposing insulating layer 115 and the metal lines 111 ranges from 250 nm to 300 nm.

Therefore, a polarizer having the best reflection/transmission characteristic is achieved when the interval between the opposing insulating layer 115 and the metal lines 111 is in the range of about 250 nm to about 300 nm.

Next, a reflection characteristic will be described with reference to FIG. 15 to FIG. 19.

FIG. 15 to FIG. 19 are graphs of characteristics of exemplary embodiments of a polarizer according to the invention.

Figure 15:
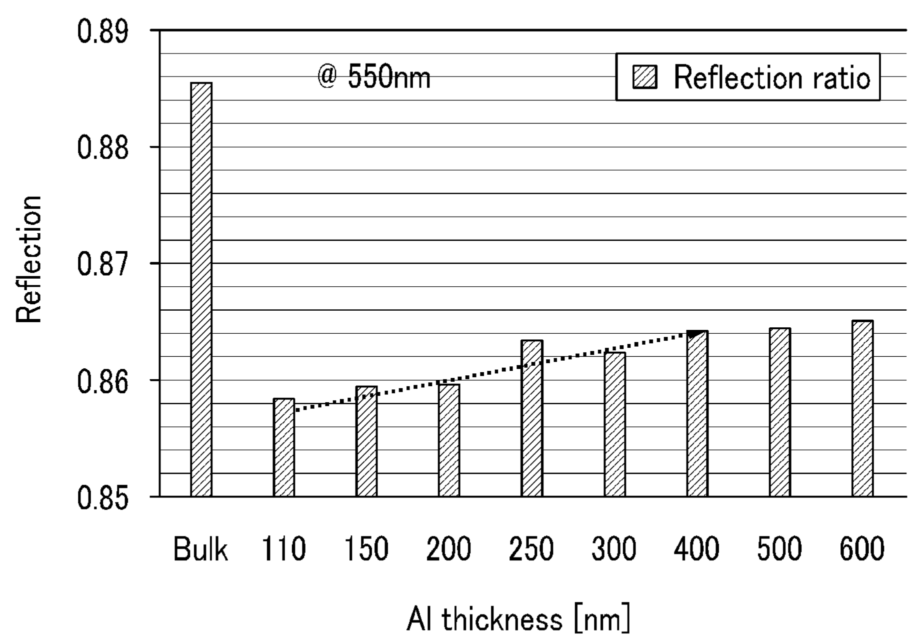
FIG. 15 to FIG. 19 are graphs of characteristics of an exemplary embodiment of a polarizer according to the invention.
Figure 16:
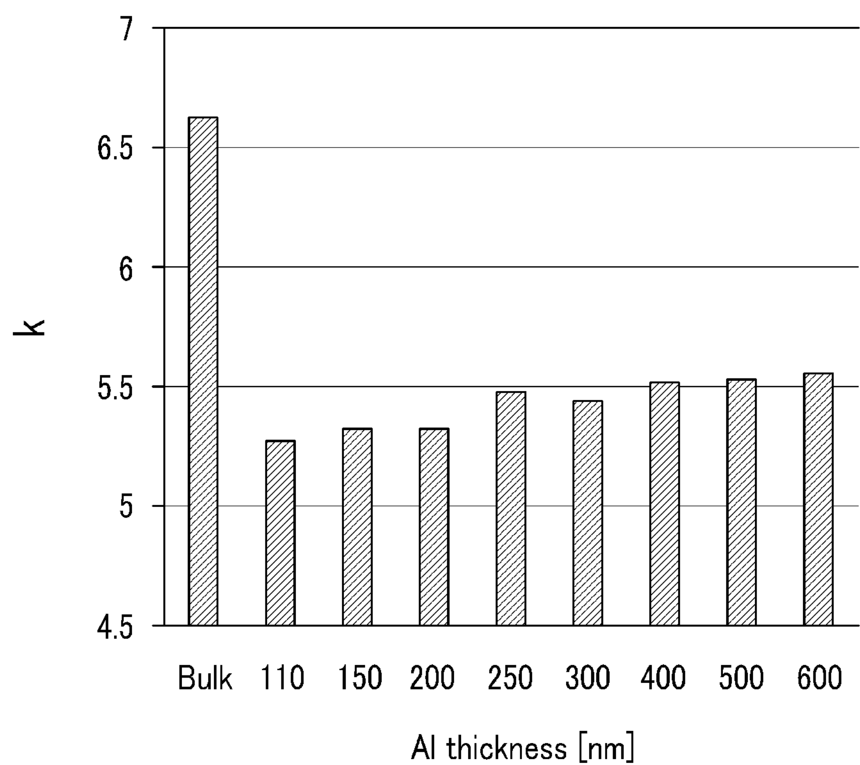
Figure 17:
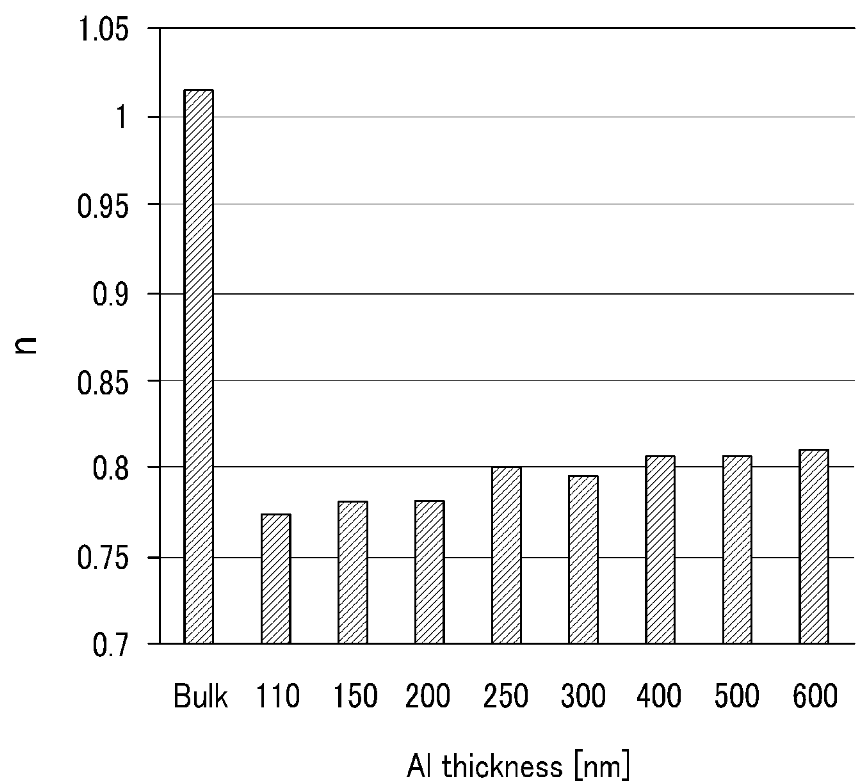

Firstly, FIG. 15 to FIG. 17 show the reflection characteristics for the light that is incident under (e.g., on a lower surface of) the polarizer of FIG. 2.

FIG. 15 represents a reflection ratio according to thickness in nm of aluminum (Al) which is used as the metal for the metal lines and/or the plate-type metal pattern, at a light wavelength of 550 nm.

As shown in FIG. 15, when the aluminum is thick ("Bulk"), the reflection ratio may be over 88%, and as the thickness of the aluminum is increased, the reflection ratio and reflection percentage is increased.

FIG. 16 and FIG. 17 represent two refractive indexes (k and n) according to a thickness in nm when using aluminum (Al) as the metal for the metal lines and/or the plate-type metal pattern.

According to FIG. 16 and FIG. 17, as the thickness of the metal is increased, the refractive index that is experienced by the light incident into the polarizer 11 is increased.

According to FIG. 15 to FIG. 17, since incident light is reflected in the non-opening BM, the reflection ratio and the refractive index of the light incident from below the polarizer may be initially determined by the thickness of the plate-type metal pattern 112. As the reflection ratio is increased, the efficiency of the non-opening BM is better. However the thickness of the plate-type metal pattern 112 corresponds to the thickness of the metal line 111 such that there is a limit in increasing the thickness. Accordingly, in the exemplary embodiment of the polarizer of the invention, the additional plate-type pattern 113 is further formed on the plate-type metal pattern 112, and the additional plate-type pattern 113 is formed with the dielectric material having the highly reflective characteristic, thereby increasing the light that is reflected by the lower polarizer 11 and returned to the backlight 500.

Figure 18:
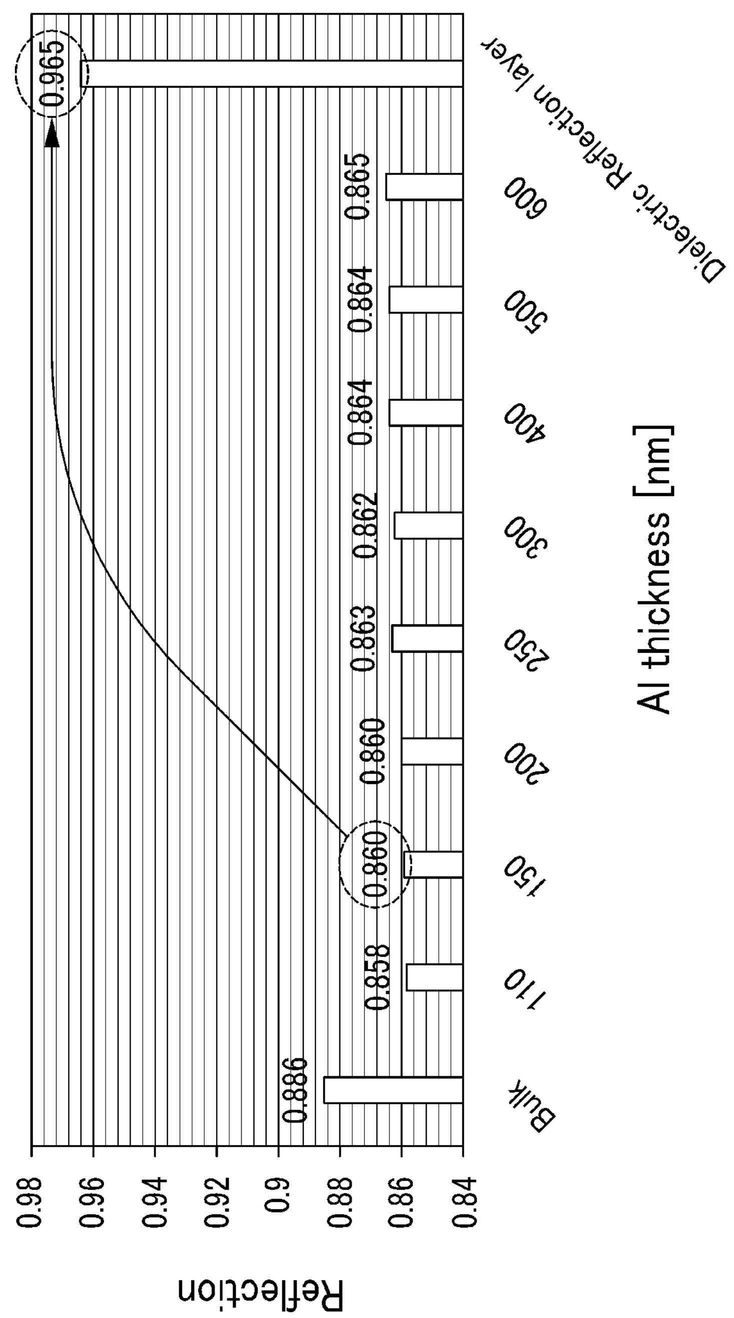
Figure 19:
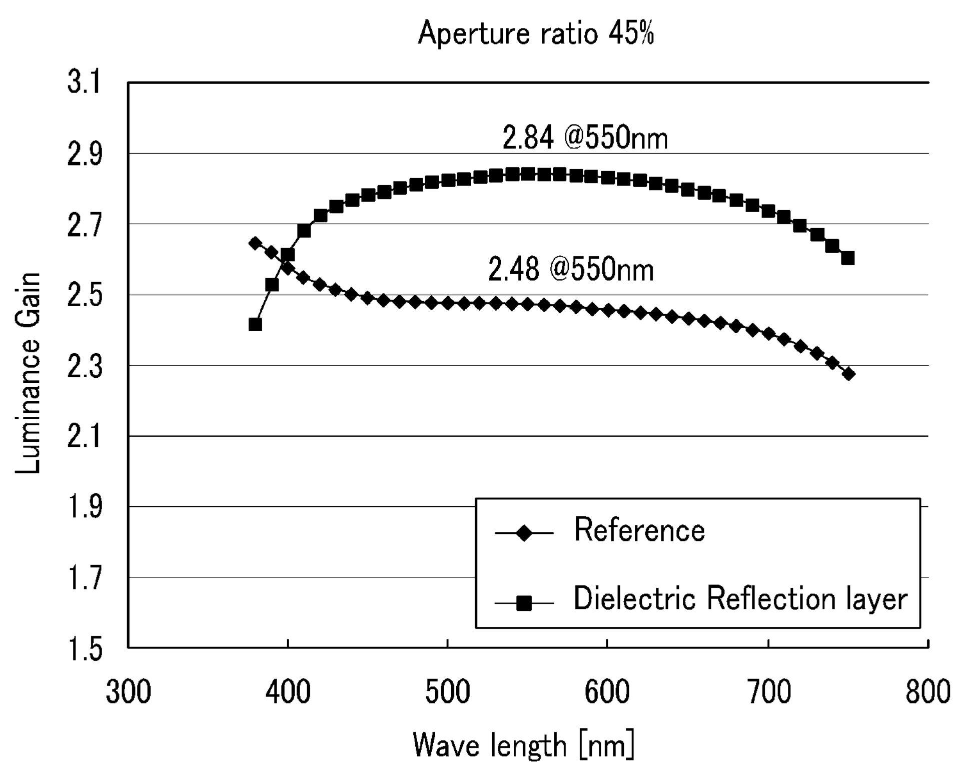

FIG. 18 and FIG. 19 represent reflection characteristics for the light that is incident on an upper surface of exemplary embodiments of the polarizer of FIG. 2.

FIG. 18 represents the reflection ratio according to the thickness in nm when the additional plate-type pattern 113 includes aluminum (Al) metal or includes the dielectric material, in the light wavelength of 550 nm.

In FIG. 18, "Bulk" is a case that the plate-type pattern in the non-opening BM includes the aluminum that is thickly formed. The numbers 110-600 indicate the thickness of the aluminum of the plate-type pattern in the non-opening BM. The "Dielectric Reflection layer" indicates a multi-layer plate-type pattern including the plate-type metal pattern 112 including aluminum at a thickness of 150 nm and the additional plate-type pattern 113 thereon. The additional plate-type pattern 113 includes a TiO2 layer at a thickness of 50 nm and a SiO2 layer at a thickness of 75 nm.

Referring to the reflection ratio of the light that is incident upward, the best reflection ratio may be obtained in the case of the Dielectric Reflection layer. That is, where the reflection ratio for the polarizer using the dielectric reflection layer is examined for the light that is incident upward, the structure of FIG. 2 is reversely disposed under the lower insulation substrate 110 such that the additional plate-type pattern 113 of the dual layer plate-type pattern is disposed closer the backlight unit 500.

A comparison of reflection ratio for an exemplary embodiment of a polarizer including the Dielectric Reflection layer described above, and the comparative example polarizer of FIG. 12 is shown in FIG. 19.

Referring to FIG. 19, there are differences in luminance gain according to the wavelength in nm of light. The exemplary embodiment of the polarizer of the invention using the Dielectric Reflection layer has an excellent reflection characteristic compared to that of the comparative example polarizer ("Reference"), such that the efficiency of the light recycling in the exemplary embodiment of the polarizer is excellent.

As a result, by using the polarizer including the dielectric reflection layer, the light recycling efficiency may be improved.

Next, a structure of another exemplary embodiment of a polarizer according to the invention will be described with reference to FIG. 20.

Figure 20:
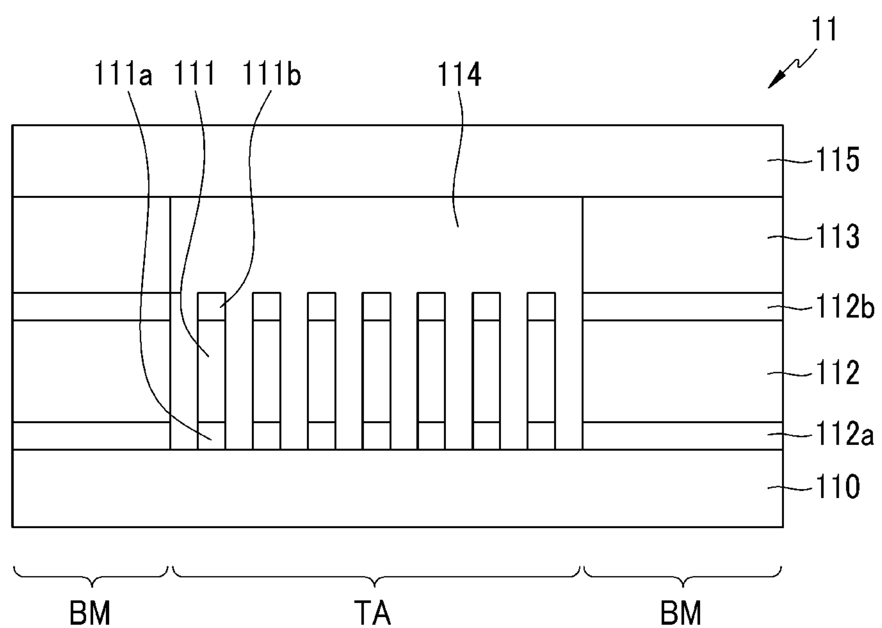
FIG. 20 is an enlarged cross-sectional view of another exemplary embodiment of a polarizer according to the invention.

FIG. 20 is an enlarged cross-sectional view of another exemplary embodiment of a polarizer according to the invention. While FIG. 20 indicates a lower polarizer, according to an exemplary embodiment, a polarizer according to the illustrated exemplary embodiment of FIG. 20 may be applied to the upper polarizer 21.

The exemplary embodiment of FIG. 20 of a polarizer includes an additional layer further formed on and under the metal line 111, and on and under the plate-type metal pattern 112, different from the exemplary embodiment of FIG. 2. That is, a first minute additional layer 111*a* and a first plate-type additional layer 112*a* are respectively disposed under the metal line 111 and the plate-type metal pattern 112, and a second minute additional layer 111*b* and a second plate-type additional layer 112*b* are respectively disposed above the metal line 111 and the plate-type metal pattern 112.

The first minute additional layer 111*a*, the first plate-type additional layer 112*a*, the second minute additional layer 111*b* and the second plate-type additional layer 112*b* may include the metal. In the illustrated exemplary embodiment, the first minute additional layer 111*a*, the first plate-type additional layer 112*a*, the second minute additional layer 111*b* and the second plate-type additional layer 112*b* include the dielectric material. The dielectric material may include a material such as TiO2 or SiO2, and may have a highly reflective characteristic or an anti-reflective characteristic. Also, each of the first minute additional layer 111*a*, the first plate-type additional layer 112*a*, the second minute additional layer 111*b* and the second plate-type additional layer 112*b* may be a single layer structure or may be a multi-layer structure.

In an exemplary embodiment of manufacturing a polarizer, the first minute additional layer 111*a* and the second minute additional layer 111*b* are etched along with the metal line 111, thereby forming patterns of the first minute additional layer 111*a* and the second minute additional layer 111*b* elongated in the one direction and separated by the predetermined interval in the different direction. The interval between adjacent patterns of the first minute additional layer 111*a* and the second minute additional layer 111*b* is smaller than the wavelength of the visible rays, as is described above for the metal lines 111.

The first minute additional layer 111*a* and the first plate-type additional layer 112*a* may include the same material and the same thickness. Also, the second minute additional layer 111*b* and the second plate-type additional layer 112*b* may include the same material and the same thickness.

The additional plate-type pattern 113 made of the dual layer plate-type pattern is positioned on the second plate-type additional layer 112*b*. The additional plate-type pattern 113 may include a single layer of the metal or the dielectric material, or a multi-layer structure including both the metal and the dielectric material. The additionally plate-type pattern 113 of the illustrated exemplary embodiment has the multi-layer structure in which TiO2 is disposed at the upper side of the additional plate-type pattern 113 and SiO2 is disposed at the lower side of the additional plate-type pattern 113.

A transparent region 114 is defined on the second minute additional layer 111*b*. The transparent region is defined between adjacent metal lines 111, between adjacent first and second minute additional layers 111*a* and 111*b*, between adjacent additional plate-type patterns 113, and between the opposing insulating layer 114 and exposed portions of the lower insulation substrate 110. The second minute additional layer 111*b* does not contact, but is separated from, the supporting member opposing insulating layer 115 by a predetermined distance.

According to an alternative exemplary embodiment, different from the exemplary embodiment of FIG. 20, the first minute additional layer 111*a* and the first plate-type additional layer 112*a* may be omitted, or the second minute additional layer 111*b* and the second plate-type additional layer 112*b* may be omitted. Also, the additional plate-type pattern 113 may be a single layer.

Further, when using the structure of FIG. 20 as the lower polarizer or the upper polarizer 21, the metal layer 111 may be respectively positioned to be closer to the backlight unit 500 or the eye of the user, than the transparent region 114.

Next, alternative exemplary embodiments of a LCD according to the invention will be described with reference to FIG. 21 and FIG. 22.

Figure 21:
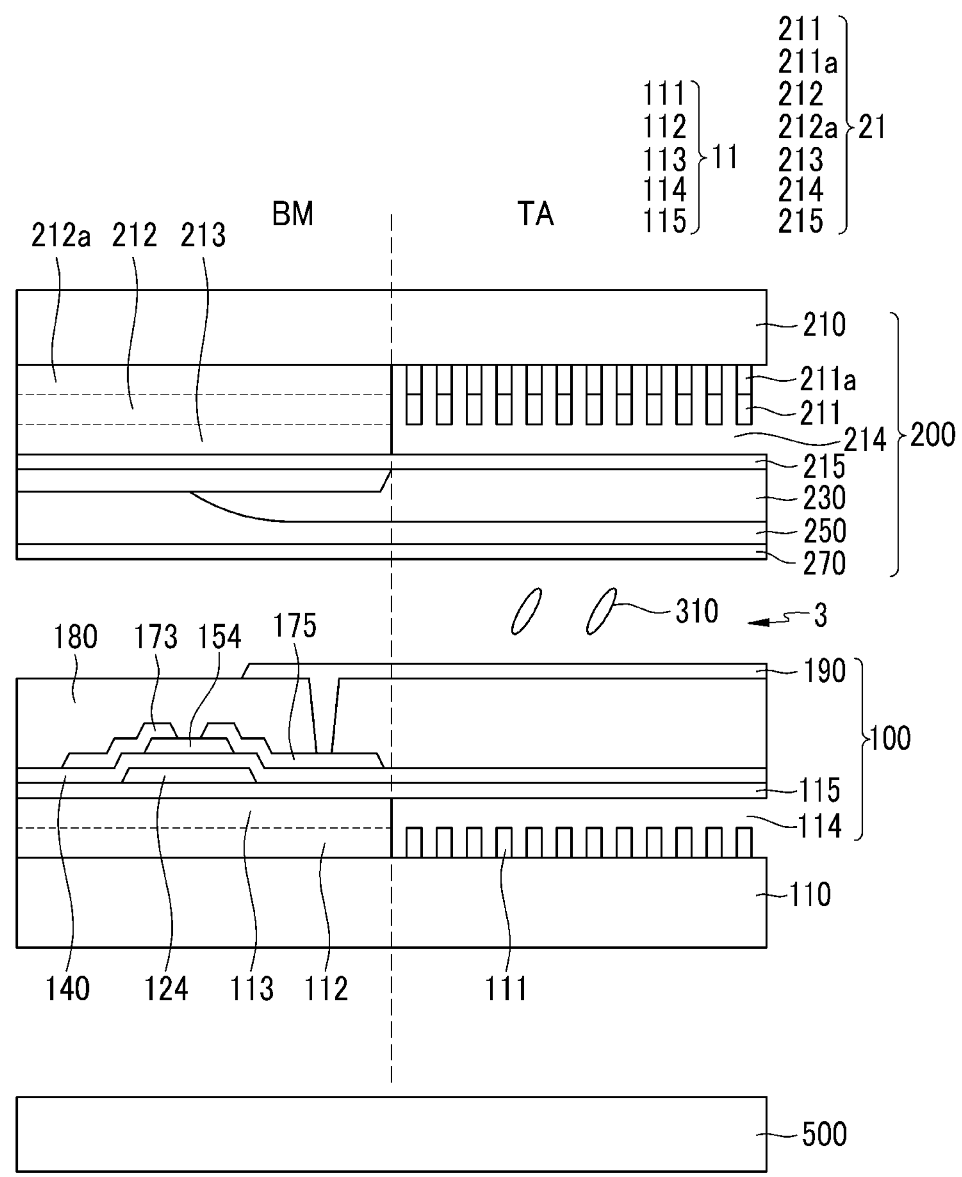
FIG. 21 and FIG. 22 are cross-sectional views of other exemplary embodiments of a liquid crystal display according to the invention.
Figure 22:
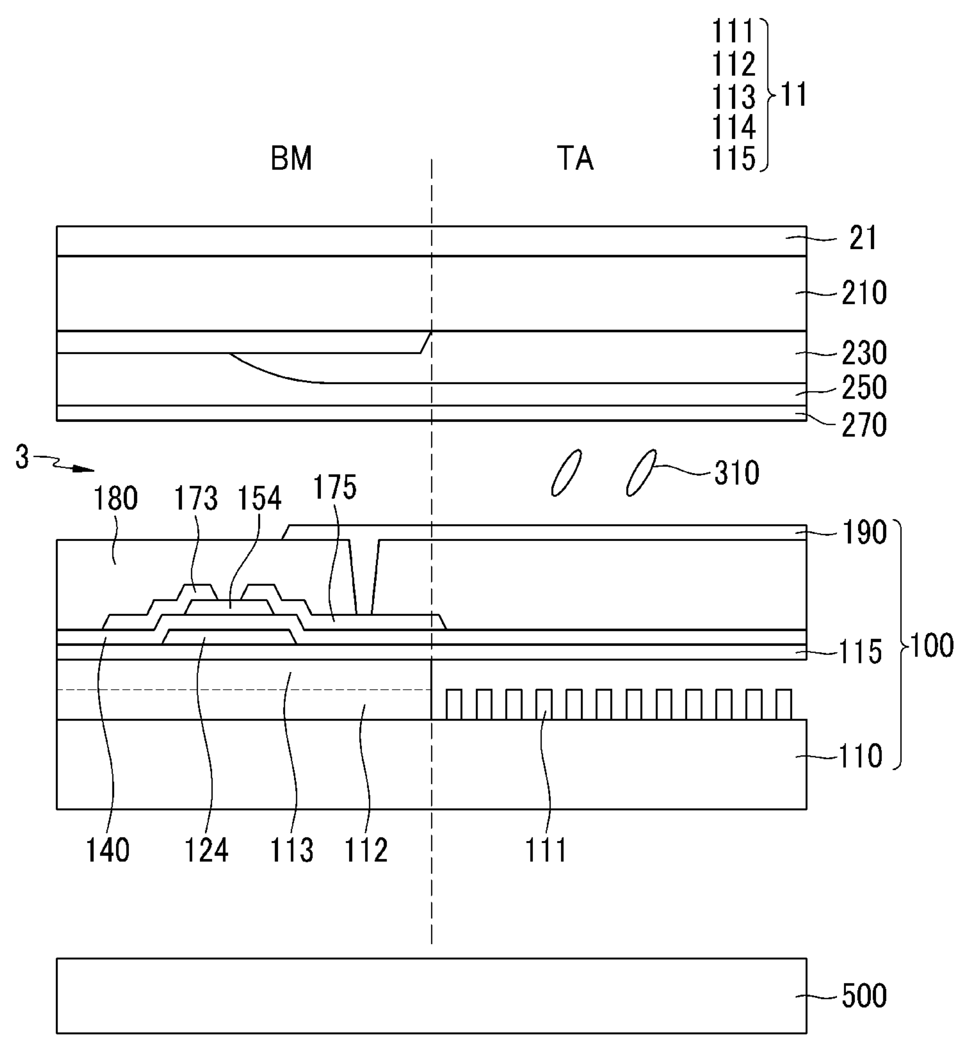

FIG. 21 and FIG. 22 are cross-sectional views of alternative exemplary embodiments of a LCD according to the invention.

Firstly, different from FIG. 1, in FIG. 21, the upper polarizer 21 is positioned inside the upper insulation substrate 210, and the metal line 211 of the upper polarizer is not disposed closer to the backlight unit 500 than a transparent region, but instead the metal line 211 is toward an outside direction of the upper polarizer 21 (e.g., toward the upper insulation substrate 210).

A relation of the upper insulation substrate 210 and the upper polarizer 21 among elements of the upper panel 200 as shown in FIG. 21 will be described.

The upper polarizer 21 is disposed under the upper insulation substrate 210, and the upper insulation substrate 210 may include transparent glass or plastic.

The upper polarizer 21 is a reflective polarizer. An opening TA is defined in the upper polarizer 21, in which a plurality of metal lines 211 are disposed. A non-opening BM is defined in the upper polarizer 21 in which the plate-type patterns 212 and 213 are disposed such that the light is not transmitted but is reflected.

The plurality of metal lines 211 disposed in the opening TA are positioned under the insulation substrate 210, are elongated in one direction and are separated with by a predetermined interval therebetween in a different direction than the one direction. The interval between adjacent metal lines 211 is smaller than a wavelength of visible rays and is several tens or hundreds of nanometers in width. The width of a metal line 211 may be various and corresponds to the interval between the adjacent metal lines 211. A thickness of the metal lines 211 may be changed according to a material of the metal lines 211, and may be several tens or hundreds of nanometers. In the illustrated exemplary embodiment, the thickness is three times the width of the metal line 211. As described above, when a plurality of metal lines 211 are arranged in one direction, the light perpendicular to the one direction may be transmitted and the light parallel to the one direction may be reflected.

The plate-type patterns 212 and 213 disposed in the non-opening BM have a larger height than that of the plurality of metal lines 211. The plate-type patterns 212 and 213 include a plate-type metal pattern 212, and an additional plate-type pattern 213 disposed on the plate-type metal pattern 212. In the exemplary embodiment of FIG. 21, an order in the up and down direction (e.g., cross-sectional or thickness direction) of the metal lines 211, the plate-type metal pattern 212, the additional plate-type pattern 213 and the transparent region 214 are reversed as compared to the order in FIG. 1.

The plate-type metal pattern 212 includes the metal of the metal lines 211 such that the light incident from the liquid crystal layer 3 to the upper panel 200 is reflected and blocked by the plate-type metal pattern 212. The plate-type metal pattern 212 may have the same height as that of the metal lines 211. The non-opening BM in which the plate-type metal pattern 212 is disposed may accord with a region where the light blocking member 220 is disposed in the liquid crystal panel, and an opening defined in the light blocking member 220 may accord with the opening TA in which the plurality of metal lines 211 is disposed. The plurality of metal lines 211 may include the same metal as the plate-type metal pattern 212, or may include a different metal from the plate-type metal pattern 212, according to an exemplary embodiment.

The additional plate-type pattern 213 is disposed under the plate-type metal pattern 212 in the cross-sectional view, and the additional plate-type pattern 213 may include the metal and/or the dielectric material. The dielectric material may include a material such as TiO2 or SiO2, a highly reflective material or an anti-reflective material.

When the additional plate-type pattern 213 includes the metal, the additional plate-type pattern 213 and the plate-type metal pattern 212 may include the same metal. According to an alternative exemplary embodiment, the additional plate-type pattern 213 and the plate-type metal pattern 212 may include different metals.

On the plurality of metal lines 211, the transparent region 214 is defined at a cross-sectional plane or region corresponding to the additional plate-type pattern 213. The transparent region 214 may be filled with air. According to an alternative exemplary embodiment, a material having a refractive index corresponding to that of air may fill the transparent region 214.

A third minute additional layer 211*a* is disposed between the upper insulation substrate 210 and the plurality of metal lines 211. The third minute additional layer 211*a* includes the dielectric material. The dielectric material may include a material such as TiO2 or SiO2, and may have a highly reflective characteristic or an anti-reflective characteristic. Also, the third minute additional layer 211*a* may include two or more layers.

Further, a third plate-type additional layer 212*a* is disposed between the plate-type patterns 212 and 213, and the upper insulation substrate 210. The third plate-type additional layer 212*a* includes the dielectric material. The dielectric material may include a material such as TiO2 or SiO2, and may have a highly reflective characteristic or an anti-reflective characteristic. Also, the third plate-type additional layer 212*a* may include two or more layers.

Here, when the third minute additional layer 211*a* and the third plate-type additional layer 212*a* have the anti-reflective characteristic, an anti-reflection or anti-glare film (or a process of forming the film) may be omitted at the outside of the upper insulation substrate 210. The an anti-reflection or anti-glare film or a process of forming thereof, may be omitted because the third minute additional layer 211*a* performs the function thereof as having an anti-reflection characteristic.

In an exemplary embodiment of manufacturing a polarizer, the third minute additional layer 211*a* is etched along with the metal line 211, is elongated in one direction, and is separated with a predetermined interval in a different direction from the one direction. Patterns of the third minute additional layer 211*a* are also separated by an interval that is smaller than the wavelength of visible rays, as similarly described for the metal lines 211.

The opposing insulating layer 215 is disposed under the additional plate-type pattern 213 and the transparent region 214. The opposing insulating layer 215 contacts the additional plate-type pattern 213 of the plate-type pattern 212 and 213, but does not contact the plurality of metal lines 211. That is, the opposing insulating layer 215 is separated from the plurality of metal lines 211 by a predetermined distance.

As described above, the upper polarizer 21 includes the metal lines 211, the plate-type patterns 212 and 213, the transparent region 214, the third minute additional layer 211*a* the third plate-type additional layer 212*a* and the opposing insulating layer 215. The upper insulation substrate 210 and the opposing insulating layer 215 are used to support the remaining elements of the upper polarizer 21 at both of opposing sides of the polarizer and protects the remaining elements. The opposing insulating layer 115 may not be considered as a part of the lower polarizer 11, such that elements of the lower polarizer 11 are between the supporting opposing insulating layer 115 and lower insulation substrate 110.

However, in an alternative exemplary embodiment, elements of the lower polarizer 11 may be sufficiently supported without a separate supporting member, such that the polarizer does not include an insulation substrate or an insulating layer. In an exemplary embodiment of manufacturing a polarizer, the upper polarizer 21 may be separately formed with the film shape including the metal lines 211, the plate-type patterns 212 and 213, the transparent region 214, the third minute additional layer 211*a,* and the third plate-type additional layer 212*a*.

The upper polarizer 21 shown in FIG. 21 is disposed under the upper insulation substrate 210, and within the liquid crystal cell, thereby realizing the exemplary embodiment of the in-cell type.

According to an exemplary embodiment, different from the upper polarizer 21 of FIG. 21, the metal lines 211 and the third minute additional layer 211*a* may be positioned at a lower side of the upper polarizer 21 and contacting the opposing insulating layer 215, the transparent region 214 may be positioned at an upper side of the upper polarizer 21, and the metal lines 211 and the third minute additional layer 211*a* may not contact the upper insulation substrate 210.

Now, a structure of FIG. 22 will be described.

In FIG. 22, the upper polarizer 21 uses an absorption-type polarizer. That is, in the invention, among the various types of polarizers, the upper polarizer 21 may use the absorption-type polarizer.

Where a luminance improvement film is not used in the backlight unit 500 while the light efficiency in the lower polarizer 11 is improved, the upper polarizer 21 uses the absorption-type polarizer thereby improving the polarization characteristic at the upper side of the LCD, such that characteristics of gray expression and white or black expression may be improved. As a result, the contrast ratio of the LCD may be increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polarizer comprising:

an opening defined in the polarizer and through which light transmits;

a non-opening which is adjacent to the opening and blocks the light;

a plurality of metal lines elongated in a first direction, and separated from each other in a second direction different than the first direction, in the opening; and a plate-type pattern in the non-opening, wherein a height of the plurality of metal lines is smaller than a height of the plate-type pattern, from a same reference; and an interval in the second direction and between adjacent metal lines is smaller than a wavelength of visible light rays.

2. The polarizer of claim 1, wherein the plate-type pattern comprises:

a plate-type metal pattern, and an additional plate-type pattern on the plate-type metal pattern, wherein a height of the plate-type metal pattern is the same as the height of the plurality of metal lines, from the same reference.

3. The polarizer of claim 2, wherein the additional plate-type pattern comprises a metal or a dielectric material, and the dielectric material comprises TiO2 or SiO2, or has a highly reflective characteristic or an anti-reflective characteristic.

4. The polarizer of claim 3, wherein the additional plate-type pattern has a dual-layered structure.

5. The polarizer of claim 3, further comprising:

a second minute additional layer above the plurality of metal lines; and a second plate-type additional layer between the plate-type metal pattern and the additional plate-type pattern, wherein a height of the second minute additional layer and a height of the second plate-type additional layer are the same, from the same reference.

6. The polarizer of claim 5, wherein the second minute additional layer and the second plate-type additional layer comprise the metal or the dielectric material.

7. The polarizer of claim 3, further comprising:

a first minute additional layer under the plurality of metal lines; and a first plate-type additional layer under the plate-type metal pattern, wherein a height of the first minute additional layer and a height of the first plate-type additional layer are the same, from the same reference.

8. The polarizer of claim 7, wherein
the first minute additional layer and the first plate-type additional layer comprise the metal or the dielectric material.

9. A liquid crystal display comprising:
a lower panel comprising: a lower insulation substrate, and a lower polarizer on a surface of the lower insulation substrate;
an upper panel comprising: an upper insulation substrate, and an upper polarizer on a surface of the upper insulation substrate;
a light blocking member, and an opening defined in the light blocking member through which light transmits; and
a liquid crystal layer between the upper panel and the lower panel,
wherein
the lower polarizer or the upper polarizer is a reflective polarizer,
the reflective polarizer comprising:
an opening defined in the reflective polarizer and through which the light transmits,
a non-opening which is adjacent to the opening and blocks the light,
a plurality of metal lines elongated in a first direction, and separated from each other in a second direction different than the first direction, in the opening, and
a plate-type pattern in the non-opening,
wherein the opening defined in the reflective polarizer has a same plane shape as the opening defined in the light blocking member.

10. The liquid crystal display of claim 9, wherein
a height of the metal lines is smaller than a height of the plate-type pattern, from a same reference, and
an interval between adjacent metal lines is smaller than a wavelength of visible light rays.

11. The liquid crystal display of claim 10, wherein
the plate-type pattern comprises:
a plate-type metal pattern, and
an additional plate-type pattern on the plate-type metal pattern,
wherein a height of the plate-type metal pattern is the same as the height of the metal lines, from the same reference.

12. The liquid crystal display of claim 11, wherein
the lower polarizer is a first reflective polarizer, and
further comprising a first opposing insulating layer covering the plurality of metal lines and the plate-type pattern of the lower polarizer,
wherein
the plurality of metal lines and the plate-type metal pattern of the lower polarizer are between the lower insulation substrate and the upper panel,
within the lower polarizer, the additional plate-type pattern is on the plate-type metal pattern, and
the first opposing insulating layer is on the additional plate-type pattern of the lower polarizer.

13. The liquid crystal display of claim 12, wherein
the first opposing insulating layer is separated from the plurality of metal lines by a predetermined distance, in a cross-section.

14. The liquid crystal display of claim 13, wherein
the additional plate-type pattern comprises a metal or a dielectric material, and
the dielectric material comprises $TiO_2$ or $SiO_2$, or has a highly reflective characteristic or an anti-reflective characteristic.

15. The liquid crystal display of claim 14, wherein
the additional plate-type pattern has a dual-layered structure.

16. The liquid crystal display of claim 14, wherein
the upper polarizer is an absorption-type polarizer.

17. The liquid crystal display of claim 14, wherein
the upper polarizer is a second reflective polarizer, and
further comprising a second opposing insulating layer covering the plurality of metal lines and the plate-type pattern of the upper polarizer,
wherein
the upper insulation substrate is between the plurality of metal lines and the plate-type metal pattern of the upper polarizer, and the lower panel,
in the upper polarizer, the additional plate-type pattern is on the plate-type metal pattern, and
the second opposing insulating layer is on the additional plate-type pattern of the upper polarizer.

18. The liquid crystal display of claim 14, wherein
the upper polarizer is a second reflective polarizer, and
further comprising a second opposing insulating layer covering the plurality of metal lines and the plate-type pattern of the upper polarizer,
wherein
the plurality of metal lines and the plate-type pattern of the upper polarizer are between the upper insulation substrate, and the lower panel,
in the upper polarizer, the additional plate-type pattern and the transparent region are under the plate-type pattern and the plurality of metal lines, respectively, and
the second opposing insulating layer is under the additional plate-type pattern and the transparent region of the upper polarizer.

19. A method manufacturing a polarizer, the method comprising:
sequentially providing a metal layer, a first hard mask material and a polymer layer, on a supporting member;
compressing the polymer layer by using a mold, to form a linear pattern in the polymer layer;
etching the first hard mask material by using the linear pattern in the polymer layer as a mask, to form a first hard mask pattern;
providing a photoresist on the first hard mask pattern in an opening area and on a non-opening area of the polarizer, and exposing the photoresist by using an exposure mask to remove the photoresist in the non-opening area of the polarizer;
sequentially providing an additional plate-type pattern material on the metal layer and the photoresist, and a second hard mask material on the additional plate-type pattern material;
lifting the photoresist to remove the additional plate-type pattern material and the second hard mask material on the photoresist together, and to form a second hard mask pattern; and
etching the metal layer and the additional plate-type pattern material by using the first hard mask pattern and the second hard mask pattern as a mask.

20. The method of claim 19, wherein
the first hard mask pattern comprises a plurality of elongated portions separated from each other by an interval which is smaller a wavelength of visible light rays.

* * * * *